US008757570B2

(12) United States Patent
Ernst et al.

(10) Patent No.: US 8,757,570 B2
(45) Date of Patent: Jun. 24, 2014

(54) WALL MOUNTABLE HOLDER SYSTEM

(75) Inventors: Richard J. Ernst, San Diego, CA (US); John P. Grimm, Santee, CA (US); Mark E. Gonciarz, South Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/361,746

(22) Filed: Jan. 30, 2012

(65) Prior Publication Data

US 2012/0126078 A1      May 24, 2012

Related U.S. Application Data

(63) Continuation-in-part of application No. 12/395,286, filed on Feb. 27, 2009, now Pat. No. 8,317,148, and a continuation-in-part of application No. 12/610,946, filed on Nov. 2, 2009, now Pat. No. 8,333,356, and a continuation-in-part of application No. 12/697,868, filed on Feb. 1, 2010, now Pat. No. 8,448,910.

(51) Int. Cl.
  *A47G 1/16*       (2006.01)
(52) U.S. Cl.
  USPC .................... 248/304; 248/223.41; 248/475.1
(58) Field of Classification Search
  USPC .......... 248/216.1, 216.4, 217.1, 217.2, 217.3, 248/217.4, 475.1, 223.41, 224.51, 224.61, 248/220.21, 220.22, 223.31, 224.41, 301, 248/304; 403/314, 365, 367, 368, 373, 403/374.1
  See application file for complete search history.

(56) References Cited

U.S. PATENT DOCUMENTS 2,883,720 A    4/1959  Hansen
3,641,866 A    2/1972  Mortensen
(Continued)

FOREIGN PATENT DOCUMENTS

DE    040 16 724    11/1991
DE    04016724      11/1991
(Continued)

OTHER PUBLICATIONS

International Searching Authority (ISA/EP) PCT Notification of Transmittal, the International Search Report and the Written Opinion for International Application PCT/US2011/002972; Mailing Date Aug. 1, 2011; 17 pages.

(Continued)

*Primary Examiner* — Steven Marsh
(74) *Attorney, Agent, or Firm* — Mark W. Croll; Maurice E. Finnegan, III; Beem Patent Law Firm

(57) ABSTRACT

A substrate-mountable holder system, comprising a base having a hook, a first front surface and a second front surface with a groove therebetween, wherein the groove includes a rearward facing face having a step. The system also includes a second portion for operatively engaging the first portion, the second portion including a tongue component positionable within the groove, wherein the tongue component includes a forward facing face having a step. The base also may include at least one notch extending inward from the rear surface, the notch having a first surface at a first depth relative to a rear surface of the base and a second surface at a second, deeper depth relative to the rear surface, and the cover may have at least one ear for releasably engaging the at least one notch.

19 Claims, 10 Drawing Sheets

(56) References Cited

U.S. PATENT DOCUMENTS

| | | |
|---|---|---|
| 4,124,189 A | 11/1978 | Eihorn |
| 4,441,619 A | 4/1984 | Gibitz |
| 4,601,625 A | 7/1986 | Ernst |
| 4,708,552 A | 11/1987 | Bustos et al. |
| 4,763,456 A | 8/1988 | Giannuzzi |
| 4,892,429 A | 1/1990 | Giannuzzi |
| 4,923,159 A | 5/1990 | Wang et al. |
| 5,039,262 A | 8/1991 | Giannuzzi |
| 5,069,411 A | 12/1991 | Murphy |
| 5,160,225 A | 11/1992 | Chen |
| 5,190,425 A | 3/1993 | Wieder et al. |
| 5,234,299 A | 8/1993 | Giannuzzi |
| 5,308,203 A | 5/1994 | McSherry et al. |
| 5,449,257 A | 9/1995 | Giannuzzi |
| 5,482,418 A | 1/1996 | Giannuzzi |
| 5,507,464 A | 4/1996 | Hamerski et al. |
| 5,529,449 A | 6/1996 | McSherry et al. |
| 5,536,121 A | 7/1996 | McSherry |
| 5,558,479 A | 9/1996 | McEldrerry |
| 5,625,994 A | 5/1997 | Giannuzzi |
| 5,692,864 A | 12/1997 | Powell et al. |
| 5,752,792 A | 5/1998 | McSherry |
| 5,833,415 A | 11/1998 | McSherry |
| 5,882,162 A | 3/1999 | Kaneko |
| 5,944,295 A | 8/1999 | McSherry |
| 5,991,998 A | 11/1999 | Kaneko |
| 6,079,921 A | 6/2000 | Gauthier et al. |
| 6,095,465 A | 8/2000 | Weck et al. |
| 6,139,236 A | 10/2000 | Ito |
| 6,186,716 B1 | 2/2001 | West et al. |
| 6,187,404 B1 | 2/2001 | Schumann |
| 6,196,780 B1 | 3/2001 | Wakai et al. |
| 6,224,030 B1 | 5/2001 | Hepworth |
| 6,250,597 B1 | 6/2001 | Kuo |
| 6,250,865 B1 | 6/2001 | McSherry |
| 6,354,779 B1 | 3/2002 | West |
| 6,382,892 B1 | 5/2002 | Hempfling |
| 6,419,436 B1 | 7/2002 | Gaudron |
| 6,629,680 B2 | 10/2003 | Weck et al. |
| 6,676,350 B1 | 1/2004 | McSherry et al. |
| 6,830,228 B2 | 12/2004 | Ernst |
| 7,070,022 B1 | 7/2006 | Diggle |
| 7,201,357 B2 | 4/2007 | Price et al. |
| 7,225,958 B2 * | 6/2007 | Hansen .................... 224/547 |
| 7,762,517 B1 * | 7/2010 | Leseman .................. 248/489 |
| 7,780,129 B1 * | 8/2010 | Cundy .................... 248/231.91 |
| 2004/0159766 A1 | 8/2004 | Skorka |
| 2005/0006554 A1 | 1/2005 | DeLine |
| 2005/0079027 A1 | 4/2005 | Ernst et al. |
| 2005/0084360 A1 | 4/2005 | Panasik |
| 2006/0024144 A1 | 2/2006 | Horvath et al. |
| 2006/0249645 A1 | 11/2006 | Price |
| 2007/0272819 A1 | 11/2007 | Wang |
| 2008/0029665 A1 | 2/2008 | Bauer |
| 2009/0212186 A1 | 8/2009 | Wang |
| 2010/0219308 A1 | 9/2010 | Ernst et al. |

FOREIGN PATENT DOCUMENTS

| | | |
|---|---|---|
| DE | 295 02 052 U | 3/1995 |
| DE | 295 09 487 U | 3/1995 |
| DE | 29502052 U1 | 3/1995 |
| DE | 29509487 U1 | 3/1995 |
| DE | 9419144 | 3/1996 |
| DE | 9419144 U1 | 3/1996 |
| DE | 093 01 098 | 1/1997 |
| DE | 09301098 | 1/1997 |
| DE | 19 852 339 | 5/2000 |
| DE | 19852339 | 5/2000 |
| DE | 20111693 | 5/2002 |
| DE | 20111693 U1 | 5/2002 |
| DE | 20 2007 005649 U1 | 4/2007 |
| DE | 20 2007 005649 U1 | 4/2007 |
| EP | 0 951 869 | 10/1999 |
| EP | 0951869 | 10/1999 |
| EP | 0 965 767 | 12/1999 |
| EP | 0965767 | 12/1999 |
| EP | 1 004 781 | 5/2000 |
| EP | 1004781 | 5/2000 |
| EP | 1 298 331 A | 2/2003 |
| EP | 1298331 A | 2/2003 |
| EP | 1 522 744 | 4/2005 |
| EP | 1522744 | 4/2005 |
| FR | 439 431 | 9/1996 |
| FR | 439 432 | 9/1996 |
| FR | 439431-439432 | 9/1996 |
| GB | 1 041 247 A | 9/1966 |
| GB | 1 047 247 A | 9/1966 |
| GB | 1 487 032 | 7/1975 |
| GB | 1487032 | 7/1975 |
| GB | 2 357 130 A | 6/2001 |
| GB | 2357130 A | 6/2001 |
| JP | 02005121224 | 5/2005 |
| WO | WO/99/05420 | 2/1999 |
| WO | WO 9905420 | 2/1999 |
| WO | WO/2004/053341 | 6/2004 |
| WO | WO 2004053341 | 6/2004 |
| WO | WO/2004/079209 | 9/2004 |
| WO | WO/2004/079210 | 9/2004 |
| WO | WO 2004079209 | 9/2004 |
| WO | WO 2004079210 | 9/2004 |
| WO | WO/2005/038275 | 4/2005 |
| WO | WO 2005038/275 | 4/2005 |
| WO | WO/2006/031421 | 3/2006 |
| WO | WO 2006031421 | 3/2006 |
| WO | WO/2006/013558 | 12/2006 |
| WO | WO 2006013558 | 12/2006 |
| WO | 2010098926 | 9/2010 |
| WO | WO/2010/098926 | 9/2010 |

OTHER PUBLICATIONS

International Searching Authority (ISA/EP) PCT Notification of Transmittal, the International Search Report and the Written Opinion for International Application PCT/US2010/054968; Mailing Date Jan. 25, 2011; 17 pages.

International Searching Authority, European Patent Office (ISA/EP); International Search Report and Written Opinion of ISA for International Application PCT/US2010/022205; Mailing Date Apr. 23, 2010.

International Searching Authority, European Patent Office (ISA/EP); International Search Report for PCT/US2006/020692; Mailing date Sep. 6, 2006; 4 pages.

International Searching Authority, European Patent Office (ISA/EP); International Search Report for PCT/US2006/020693; Mailed Oct. 24, 2006; 5 pages.

International Searching Authority, European Patent Office (ISA/EP); International Search Report for PCT/US2004/032281; Mailed Jan. 27, 2005; 2 pages.

3M, Metal Hooks, Feb. 24, 2009, 2 pages, website http://solutions.3m.com/wps/portal/3M/en_US/Command/home/us.en/products/metal_hooks.

International Searching Authority (ISA), European Patent Office mailed PCT International Search Report for PCT/US 2004/032281 on Jan. 27, 2005, 2 pages.

International Searching Authority (ISA), European Patent Office mailed PCT International Search Report for PCT/US 2006/020692 on Sep. 6, 2006, 2 pages.

International Searching Authority (ISA), European Patent Office mailed PCT International Search Report for PCT/US 2006/020693 on Oct. 24, 2006, 3 pages.

3M, Metal Hooks, Feb. 24, 2009, 2 pages, website http://solutions.3m.com/wps/portal/3M/en_US/Command/home/us_en/products/metal_hooks/.

* cited by examiner

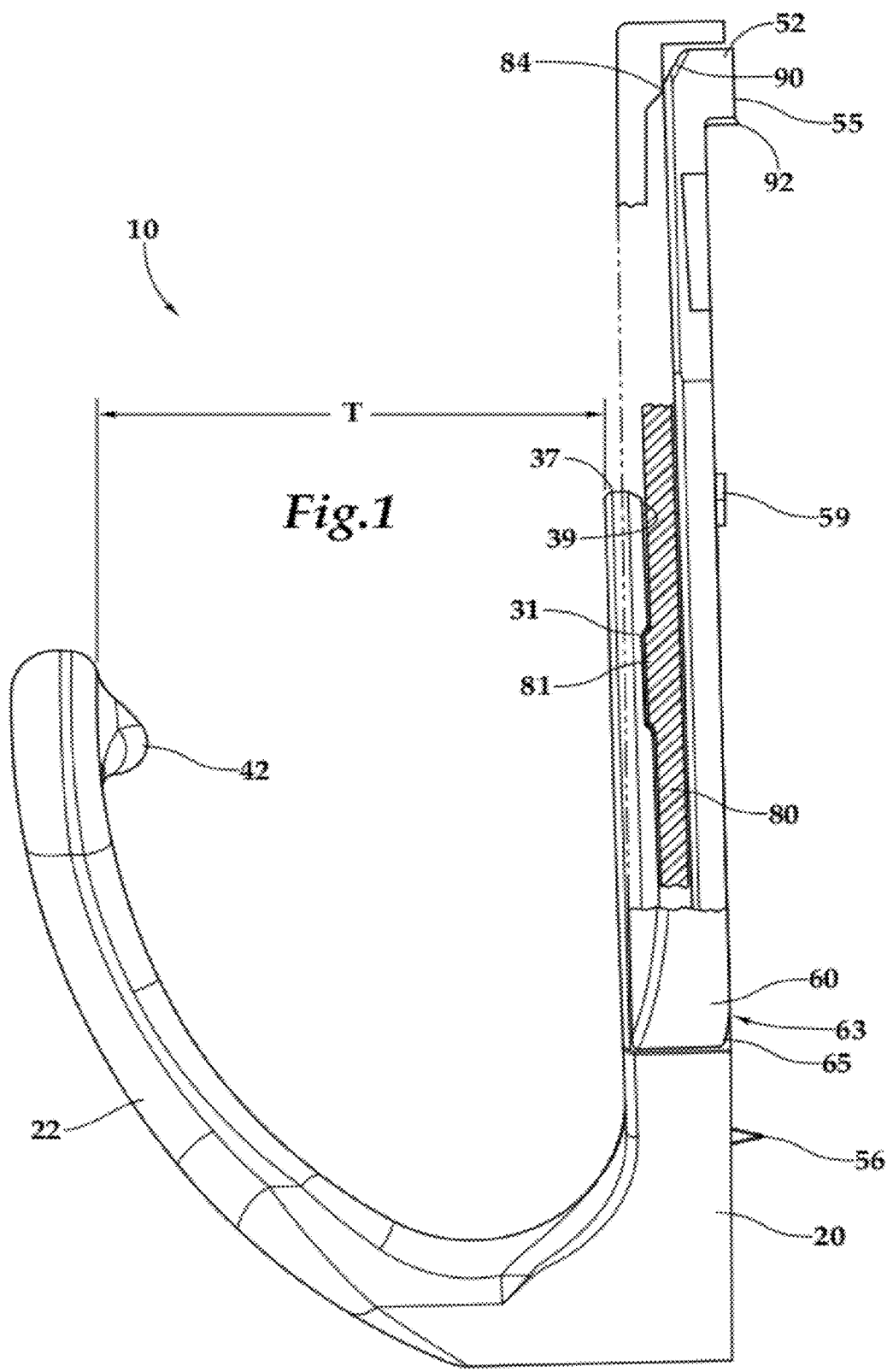

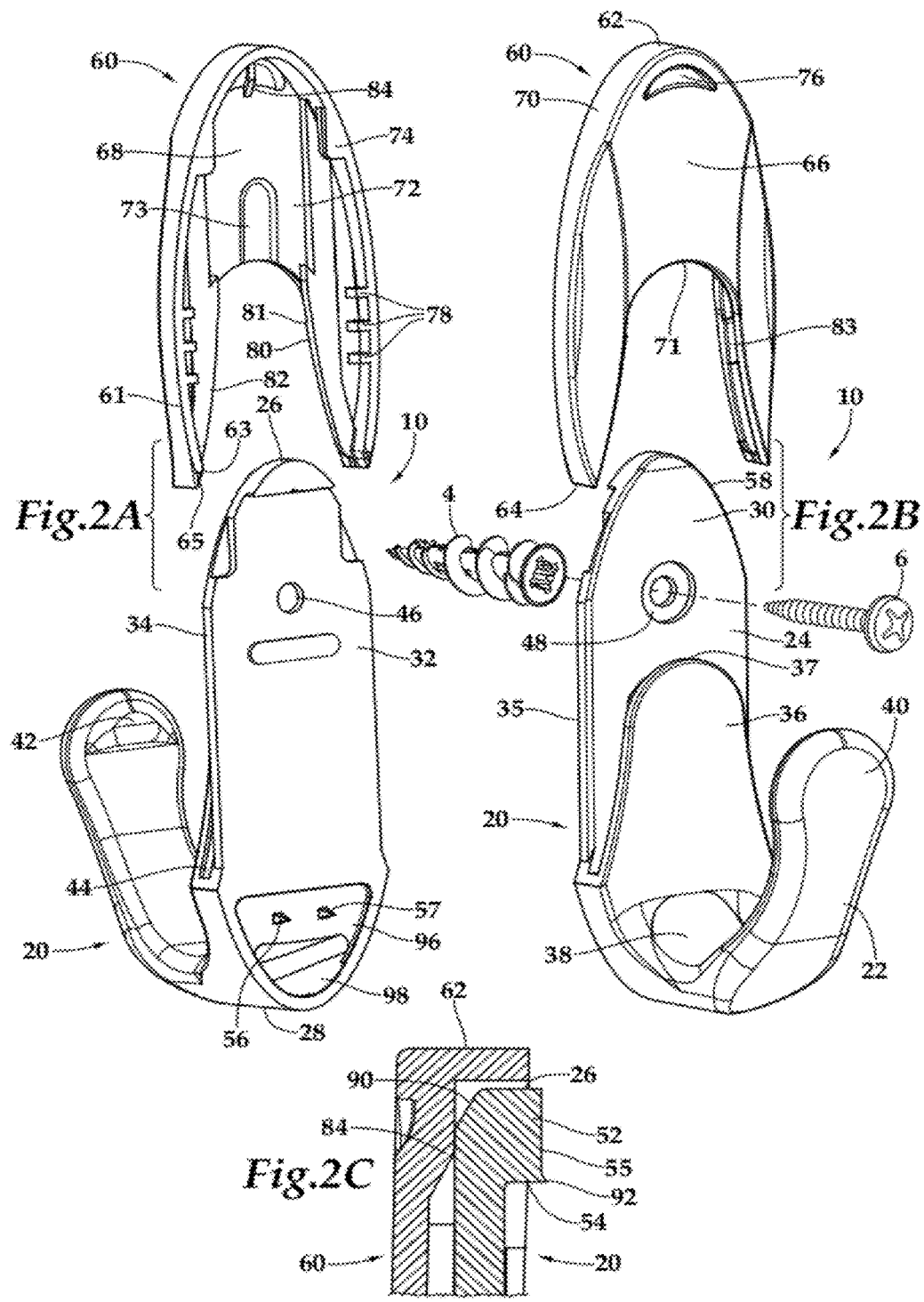

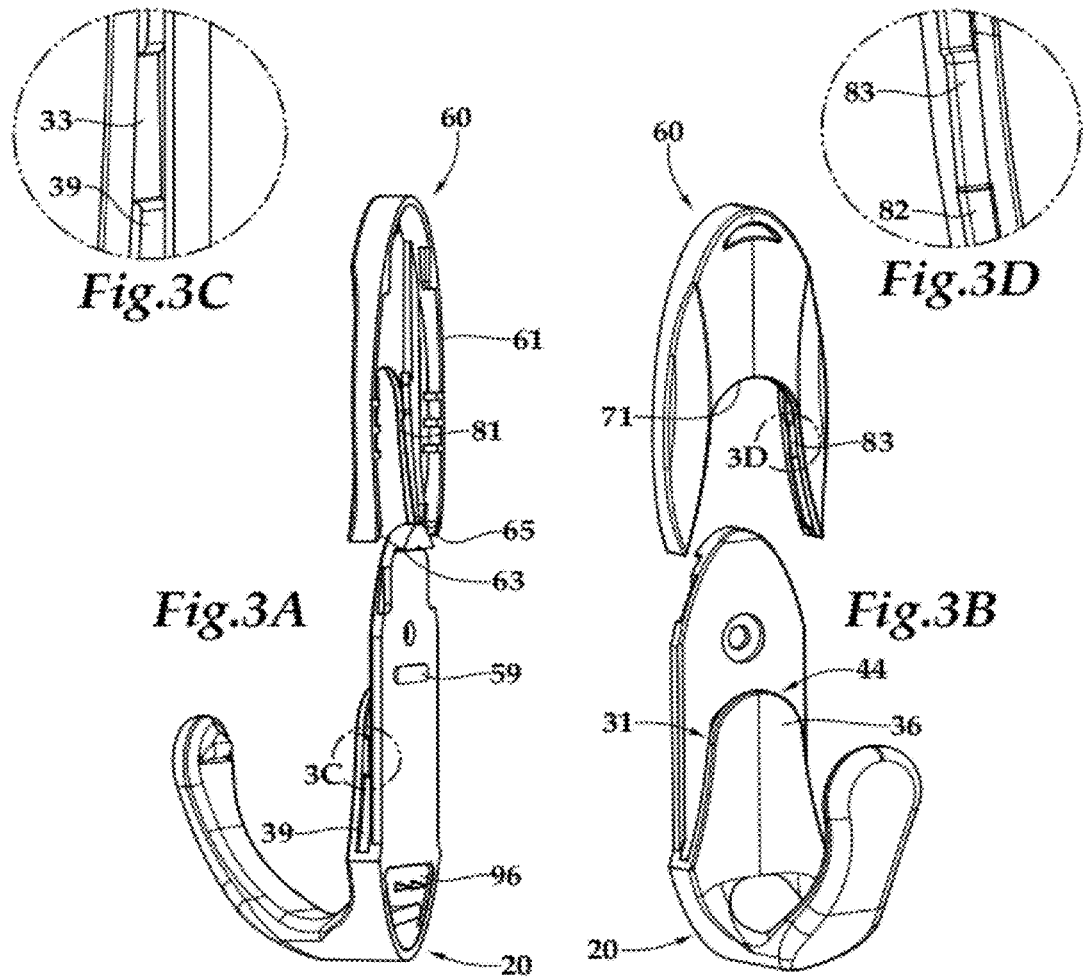
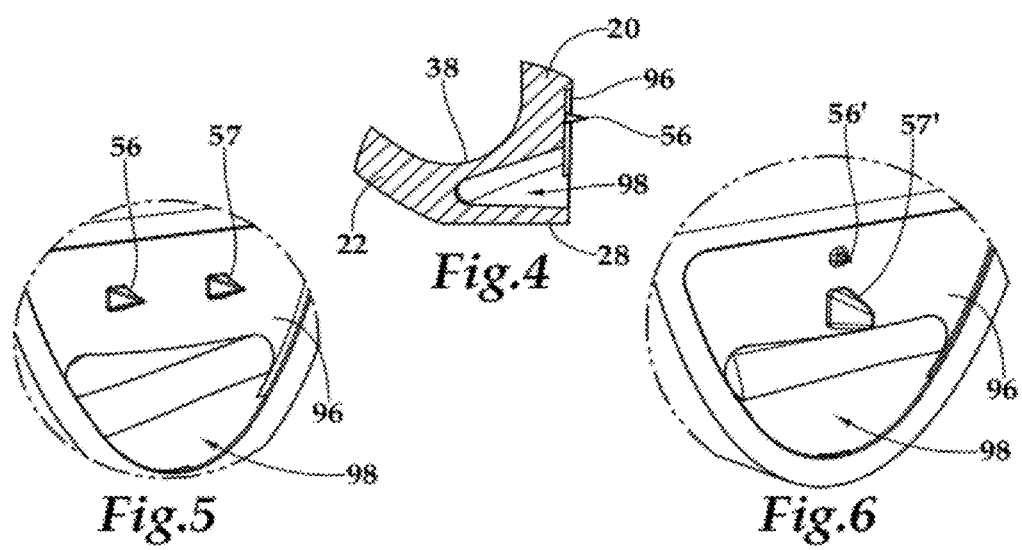

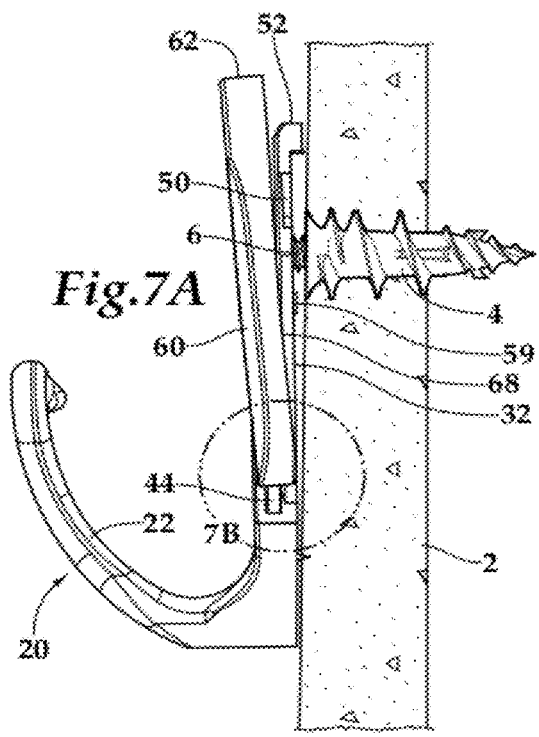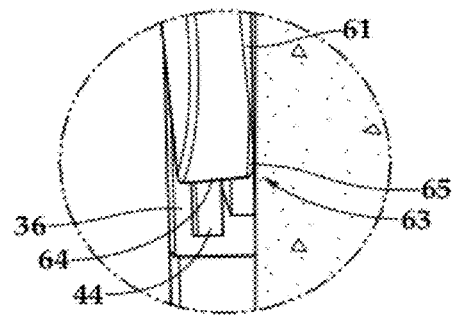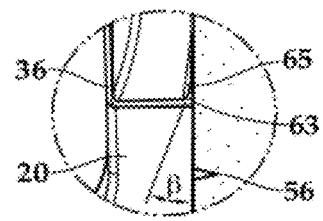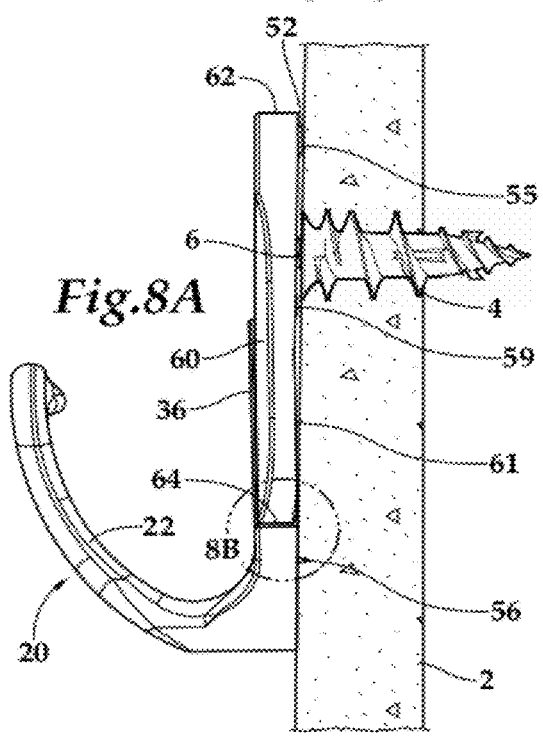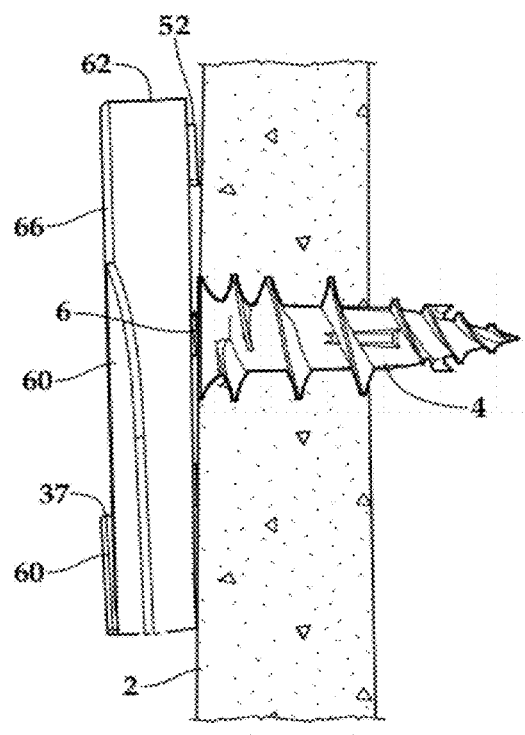

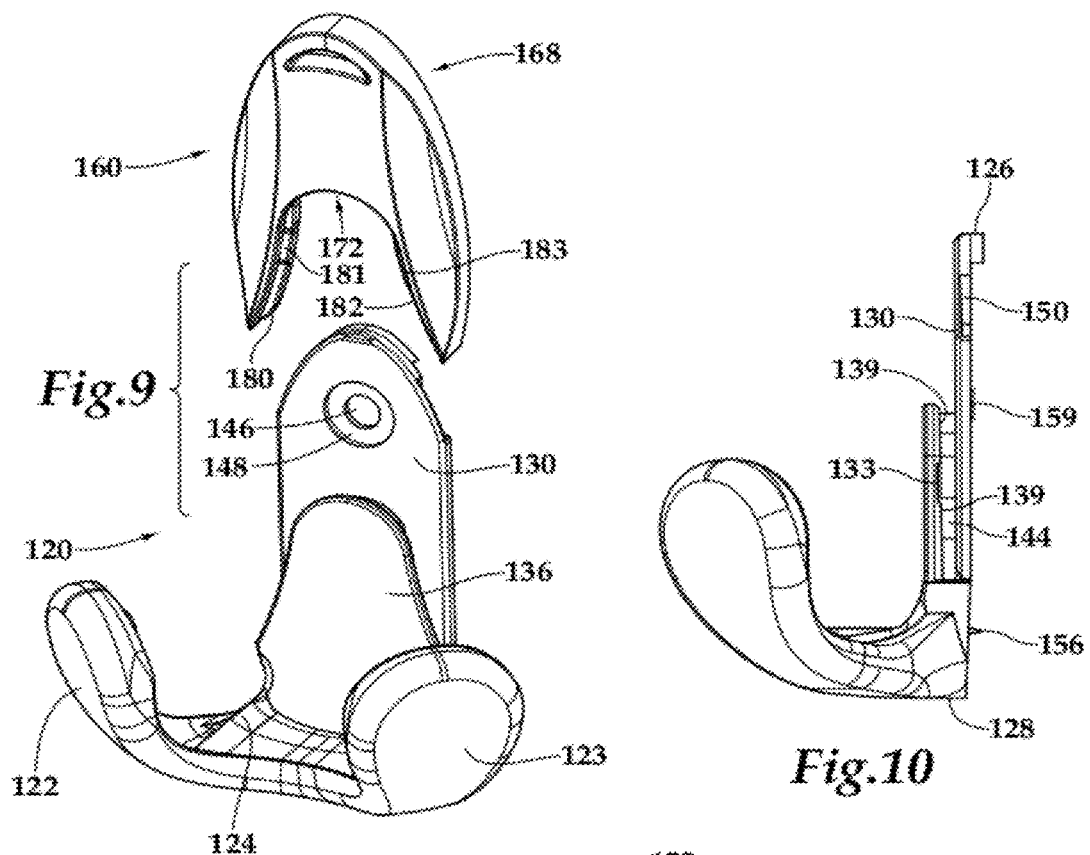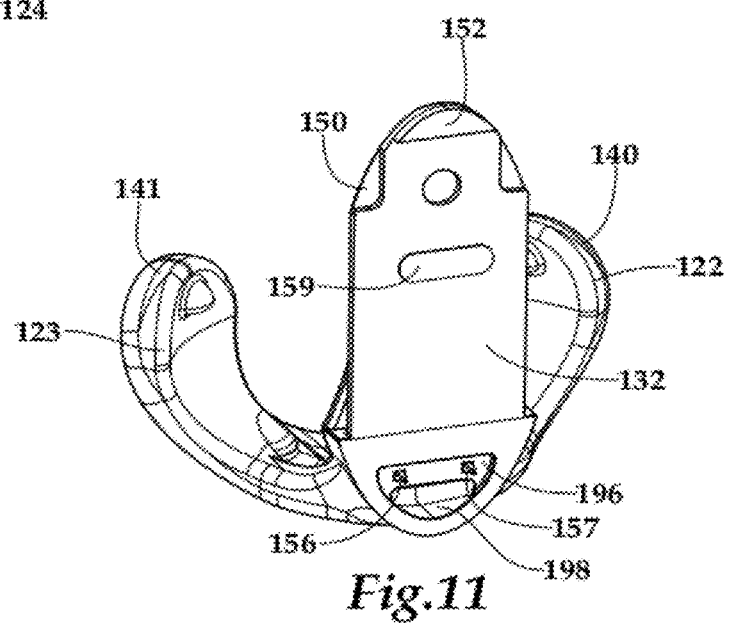

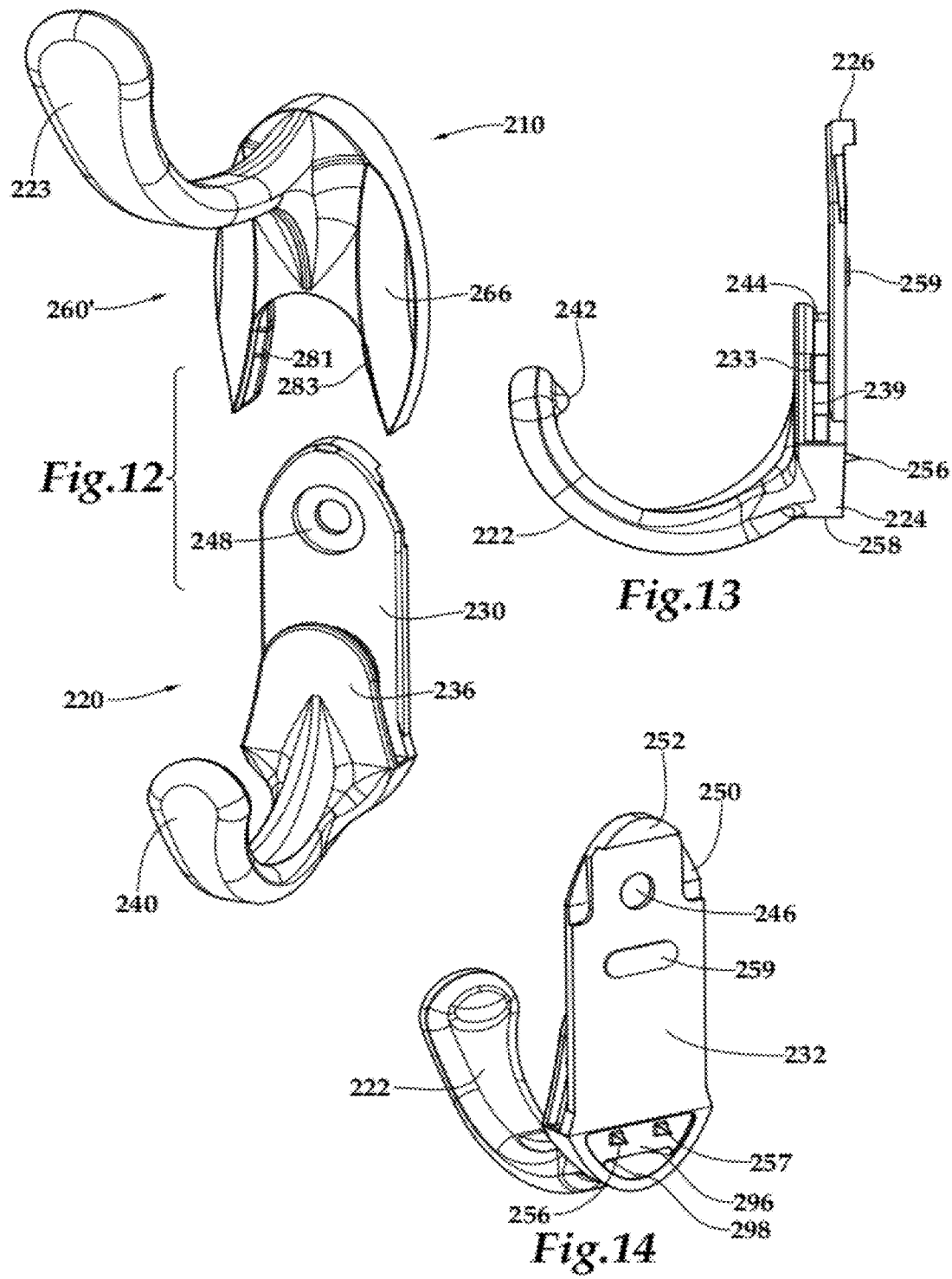

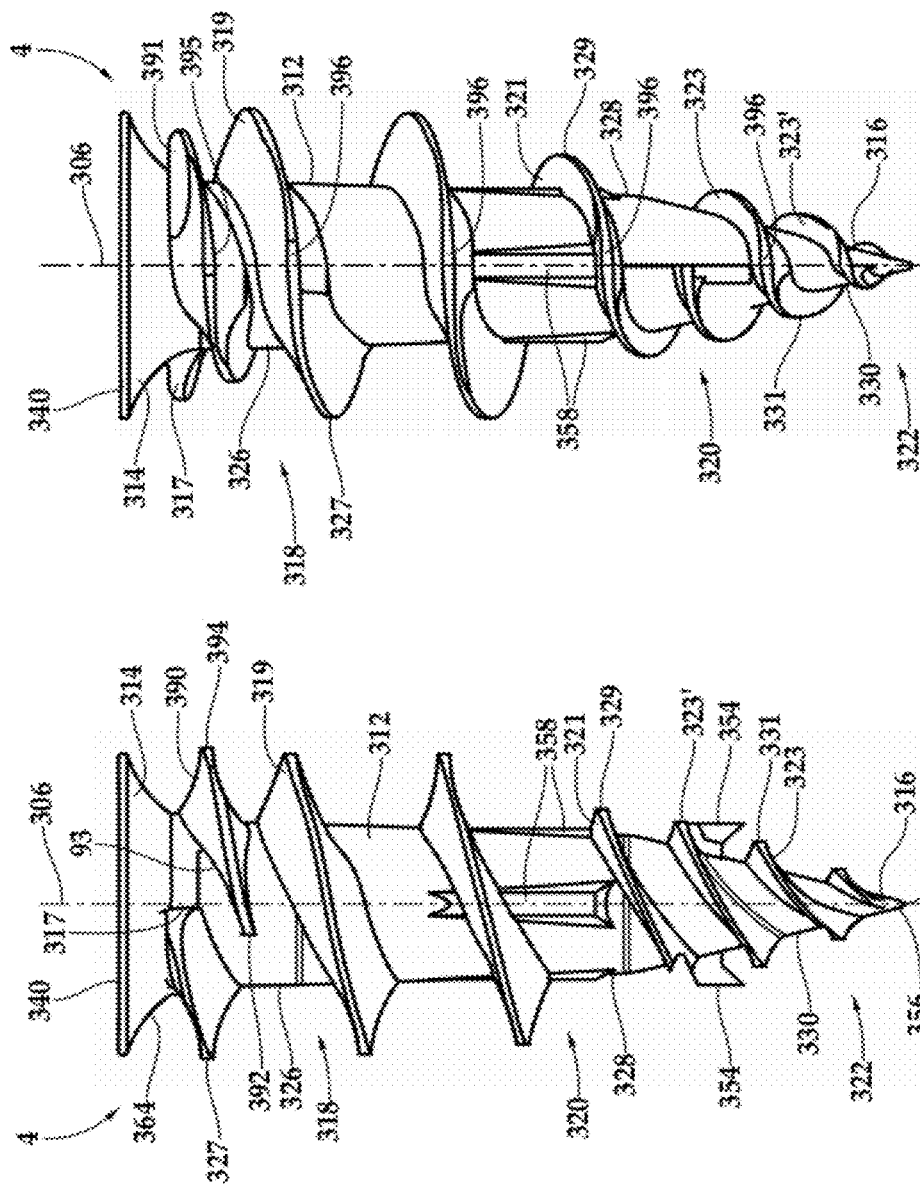

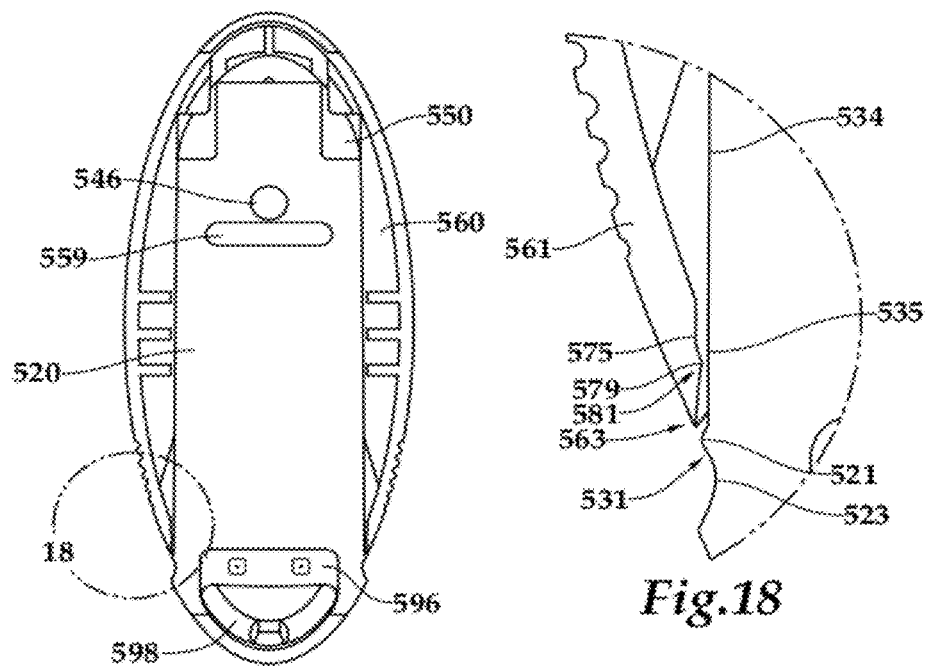
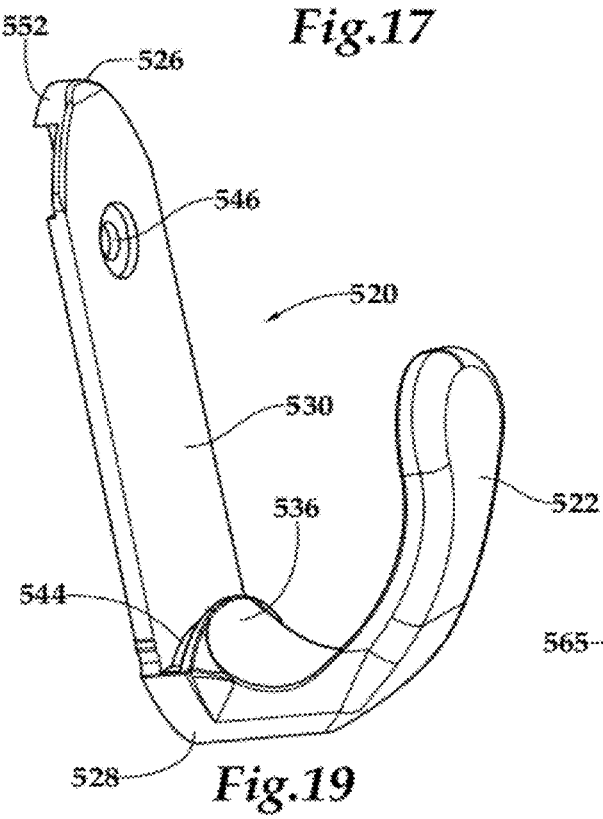
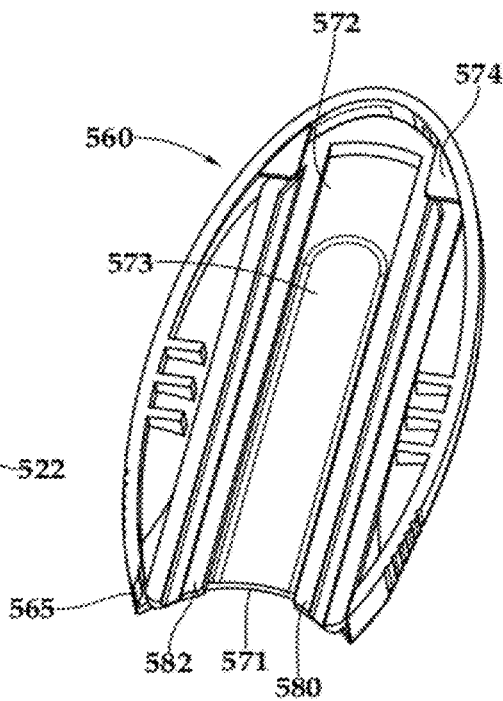
Fig.17
Fig.18
Fig.19
Fig.20

WALL MOUNTABLE HOLDER SYSTEM

This application is a continuation-in-part of U.S. patent application Ser. No. 12/395,286, filed on Feb. 27, 2009, of U.S. patent application Ser. No. 12/610,946, filed on Nov. 2, 2009, and of U.S. patent application Ser. No. 12/697,868, filed on Feb. 1, 2010.

BACKGROUND OF THE INVENTION

1. Field of the Invention

The present invention is directed to a wall mountable holder, mountable in a friable substrate such as drywall or on a semi-rigid material such as a hollow-core door, for holding objects such as household items, e.g., bags, robes, coats, etc.

2. Description of the Related Art

Wall mountable holders come in several varieties for different applications. One type of holder has an integrated screw protruding from a rear surface, the screw having relatively small root and major diameters. To install this holder, a user rotates the entire holder, driving the fastener into the mounting substrate. Unfortunately, when completely installed, the fastener may not be oriented properly and may require a partial turn to accomplish this orientation, either backing the holder out of the substrate, potentially weakening the holding strength of the holder, or embedding a non-threaded portion into the substrate, increasing stress on the holder and potentially causing the holder to fracture, deform or otherwise fail during installation. In addition, these holders generally are designed for use in rigid substrates such as exposed studs and perform poorly in friable substrates.

A second type of holder may include a base plate that is held in place on a wall while one or more sheet metal-type fasteners are driven into the substrate. As with the first variety of holder described above, this second type of holder often is not suitable for use in semi-rigid, friable or hollow substrate applications.

These first and second types of holders may be located so that the threaded portion or the fasteners, respectively, are located at a point overlying a stud. If long enough, these threaded portions may embed in the stud, thereby increasing the holder's holding strength. To accomplish this goal, however, pre-drilling into the stud may be required. In each case then, additional planning, tools and time would be required. In addition, some holders require one or more screws to be driven, but unless pilot holes are positioned, sized and pre-drilled with great care, efforts to drive screws can result in stripping of the drywall, thereby reducing holding strength.

A third type of holder is a generally one-piece design and relies on an adhesive backing to keep the holder in place. These holders may be used in a variety of locations, but their holding strength may be significantly less than that of the holders described above, even in friable substrate applications, due to the low holding strength of the adhesive. Additionally, adhesive installations require wall preparation and waiting time before mounting is complete and objects can be supported by the holder.

What is needed is a holder mountable to a friable substrate that may be installed easily for increased pullout resistance and load capacity.

BRIEF SUMMARY OF THE INVENTION

In one aspect of the invention, a substrate-mountable holder system, comprising: a first portion comprising a base having a first front surface and a second front surface, a rear surface, a top and a bottom, a hook extending from proximate the bottom, a lobe extending rearwardly from a rear surface proximate the top, a pad extending rearwardly from the rear surface, an opening for receiving an anchor extending from the first front surface to the rear surface, the opening between the lobe and the pad, and at least one detent; and a second portion for operatively engaging the first portion, the second portion comprising at least one second detent for releasably engaging the at least one detent. The system may include a self-drilling drywall anchor having a bore and a fastener for operatively engaging the first portion and the bore.

The first portion lobe may include a barb extending rearwardly from a rear surface of the lobe. In addition, the first portion may include a face angled with respect to the top and the first front surface proximate the top, and the second portion may include a cam member on a rear surface for engaging the face. Moreover, the first portion may include a tang proximate the bottom of the first portion, wherein the tang has a base located in a recess in the rear surface and the first portion may have a channel extending inward from the rear surface or from the recess.

In another aspect of the invention, a substrate-mountable holder system, comprising: a first portion comprising a base having a first front surface and a second front surface, a rear surface, a top and a bottom, a hook extending from proximate the bottom, a channel between the first and second front surfaces, and a plurality of detents within the channel; and a second portion for operatively engaging the first portion, the second portion having a plurality of tongue portions for engaging the channel and a plurality of detents on the tongue portions for engaging the plurality of detents within the channel. The first portion may have a lobe extending rearward from proximate the top and a pad spaced from the lobe and also extending rearward. The lobe may extend rearward a greater distance than the pad, and the pad may taper inward from a top towards a bottom. The plurality of detents on the first portion may be female detents, while the plurality of detents on the second portion may be male detents that taper inwards towards the tongue portions from a top towards a bottom.

In still another aspect of the invention, a substrate-mountable holder system, comprising: a first portion comprising a base having a first front surface and a second front surface, a rear surface, a top and a bottom, a hook extending from proximate the bottom, a lobe extending rearward from the rear surface proximate the top, a pad extending rearwardly from the rear surface, an opening for receiving an anchor extending from the first front surface to the rear surface, the opening between the lobe and the pad; a second portion or cover for releasably engaging the first portion, the second portion having a rear edge; and a self-drilling drywall anchor having a bore, and a fastener for operatively engaging the first portion and the bore; wherein at least a portion of the rear edge of the cover is spaced from the substrate and a bottom of the rear edge engages the substrate when the first portion is installed on the substrate and the second portion engages the first portion.

The holder system further may include a plurality of interfacing detents on the first and second portions. In addition, the second portion may include a barb extending rearwardly from the lobe and/or at least one tang extending rearwardly from the rear surface. The tang may have a base within a recess on the rear surface and may be frangible proximate its base so that if not broken cleanly, preferably any remaining tang portion does not extend beyond the recess.

In yet another aspect of the invention, a substrate-mountable holder system, comprising: a first portion comprising a base having a first front surface and a second front surface, a rear surface, a top and a bottom, a hook extending from proximate the bottom, a lobe extending rearwardly from a rear surface proximate the top, a pad extending rearwardly from the rear surface, an opening for receiving an anchor extending from the first front surface to the rear surface, the opening between the lobe and the pad; and a second portion for operatively engaging the first portion; wherein the first portion and the second portion each include at least one, and preferably a plurality of, interfacing protrusions and indentations for engaging the second portion with the first portion. Each of the protrusions and indentations on the first and second portions may be proximate the bottom of their respective portions. The system further may include a self-drilling drywall anchor having a bore, and a fastener for operatively engaging the first portion and the bore.

In still another aspect of the invention, a substrate-mountable holder system may comprise a first portion comprising a base having a first front surface and a second front surface, a rear surface, a top and a bottom, a hook extending from proximate the bottom, and a channel between the first and second front surfaces; and a second portion for operatively engaging the first portion, the second portion having a plurality of tongue portions for engaging the channel; wherein the first and second portions each include a set of releasably interfacing protrusions and indentations. The first portion may include an opening for receiving a fastener, wherein the pad is substantially aligned with an edge of the opening or wherein an upper edge of the pad is spaced from the center by a distance less than the radius of the head of an anchor. In addition, the protrusion on the first portion may be larger than the protrusion on the second portion.

In a further aspect of the invention, a substrate-mountable holder system, comprising: a first portion comprising a base having a first front surface and a second front surface with a channel therebetween, a rear surface, a top and a bottom, a hook extending from proximate the bottom, a lobe extending rearward from the rear surface proximate the top, an opening for receiving an anchor extending from the first front surface to the rear surface, a pad extending rearwardly from the rear surface substantially adjacent to the opening; a second portion for releasably engaging the first portion, the second portion having a plurality of tongue portions extending downward for engaging the channel, wherein the tongue portions extend from rails along a back of the second portion; and a self-drilling drywall anchor having a bore, and a fastener for operatively engaging the first portion and the bore. Additionally, each of the rails may extend substantially a length of the second portion, and each of the rails may include a channel along substantially a length of the rail. The first portion may include a plurality of guides and at least one notch, and the second portion may include at least one respective ear for guiding and connecting the second portion to the first portion.

In still another embodiment, a substrate-mountable holder system may include: a first portion comprising a base having an opening for receiving a fastener to mount the base to a substrate, a hook, a first front surface and a second front surface with a groove therebetween, wherein the groove includes a rearward facing face having a step; and a second portion for operatively engaging the first portion, the second portion including a tongue component positionable within the groove, wherein the tongue component includes a forward facing face having a step.

The groove may include a ramp surface between the step on the first portion and a bottom of the groove. Similarly, the tongue component may include an angled face between the step on the second portion and a bottom of the tongue component. In addition, the step on the second portion may include a radiused edge and also may have a horizontal length greater than a horizontal length of the step on the first portion, but both steps may have generally equal heights.

The second portion may include an ear and the first portion may have a notch configured to receive the ear. The notch may extend downward from a top of the first portion and may have a height such that the ear remains disposed within the notch after the tongue component clears the rearward facing face of the groove. Additionally, the notch may include a first notch surface at a first depth relative to a back of the base and a second notch surface at a second, deeper depth relative to the back.

In yet another embodiment, a substrate mountable holder system may include: a base having first and second front surfaces, a rear surface, a top and a bottom, one or more openings for receiving a fastener, a hook extending from proximate the bottom, and a channel between the first and second front surfaces. The base also may include at least one notch extending inward from the rear surface, the notch having a first surface at a first depth relative to a rear surface of the base and a second surface at a second, deeper depth relative to the rear surface. The holder system also may include a cover having at least one ear for releasably engaging the at least one notch and one or more guides extending inward from a side of the cover. When the cover is coupled to the base, at least a portion of the ear may be disposed along the first surface of the notch.

One of the guides may form a lower portion of one of the ears on each side of the cover. Additionally, one of the guides may extend inward a smaller amount than another one of the guides so as to accommodate a wider portion of the base, e.g., a portion beneath the notches.

A plurality of different covers may be used with the base, including generally flat-faced covers and covers with one or more hooks extending away from the front surface. In the latter case, at least one of the ears may extend between about ⅓ and about ½ the height of the cover. The notch may include an inset portion proximate the top, the inset portion extending inwards from the second surface and having a depth substantially equal to the first surface. The at least one ear may be configured to be received in the notch at substantially all of the inset portion and a majority of the first surface, and at least one of the base and cover may be substantially symmetrical.

These and other features and advantages are evident from the following description of the present invention, with reference to the accompanying drawings.

BRIEF DESCRIPTION OF THE SEVERAL VIEWS OF THE DRAWINGS

FIG. 1 is a perspective, partial cross-sectional view of one embodiment of a holder system mountable to a variety of substrates for holding an object.

FIG. 2A is a perspective, exploded view of the base and cover portions of one embodiment of a holder system mountable to a variety of substrates for holding an object.

FIG. 2B is a perspective, exploded view of the holder system of FIG. 2A.

FIG. 2C is a partial section view of the intersection of base and cover portions of the holder system of FIG. 2A.

FIG. 3A is another perspective, exploded view of the base and cover portions of the holder system of FIG. 2A.

FIG. 3B is another perspective, exploded view of the base and cover portions of the holder system of FIG. 2A.

FIG. 3C is a detail view of Section 3C in FIG. 3A.

FIG. 3D is a detail view of Section 3D in FIG. 3B.

FIG. 4 is a partial section view of the base of the holder system of FIG. 2A.

FIG. 5 is a partial perspective view of a rear portion of the base of the holder system of FIG. 2A.

FIG. 6 is a partial perspective view of another embodiment of a base.

FIG. 7A is a side view at one stage during the installation of the cover portion of the holder system of FIG. 2A.

FIG. 7B is a detail view of Section 7B in FIG. 7A.

FIG. 8A is a side view at a second stage during the installation of the cover portion of the holder system of FIG. 2A.

FIG. 8B is a detail view of Section 8B in FIG. 8A.

FIG. 8C is a detail view of the top portion of FIG. 8A.

FIG. 9 is a perspective, exploded view of another embodiment of a holder system mountable to a variety of substrates for holding an object.

FIG. 10 is a side view of the base portion of FIG. 9.

FIG. 11 is a rear, perspective view of the base portion of FIG. 9.

FIG. 12 is a perspective, exploded view of yet another embodiment of a holder system mountable to a variety of substrates for holding an object.

FIG. 13 is a side view of the base portion of FIG. 12.

FIG. 14 is a rear, perspective view of the base portion of FIG. 12.

FIG. 15 is a side view of one type of self-drilling anchor used in a holder system mountable to a variety of substrates for holding an object.

FIG. 16 is a second side view of the anchor of FIG. 15, rotated 90 degrees from FIG. 15.

FIG. 17 is a rear, partially exploded view of still another embodiment of a holder system mountable to a variety of substrates for holding an object.

FIG. 18 is a detail view of section 18 in FIG. 17.

FIG. 19 is a side, perspective view of the base portion of FIG. 17.

FIG. 20 is a rear, perspective view of the cover portion of FIG. 17.

DETAILED DESCRIPTION

Figure 21:
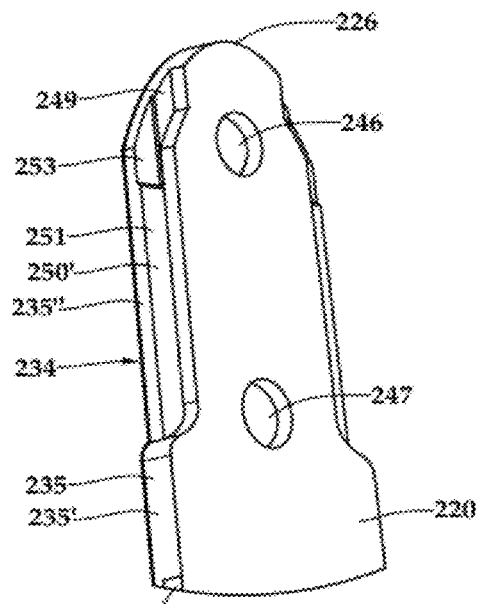
FIG. 21 is a front, perspective view of another embodiment of a base portion.

In one embodiment, a hook system 10 for mounting to a substrate 2 may include a first portion 20, a second portion or cover 60, an anchor 4 and fastener 6, wherein the first and second portions may be substantially symmetrical about an axis or plane 8. The hook system 10 may include at least one set of interfacing male and female detents on the first and second portions to hold those portions together.

In addition, as seen in FIG. 1, first portion 20 may include a raised, upper lobe 52 proximate its top 26 and a stopper pad 59 on its back portion 32. When installed against a substrate 2, first portion 20 may bow in the area around fastener opening 46. Upper lobe 52 and stopper pad 59 may limit the amount of bowing so that detents 31, 33 on first portion 20 remain in a generally predictable, generally constant location relative to substrate 2. In another embodiment, upper lobe 52 may include a barb that may embed in substrate to prevent rotation or translation of first portion 20 relative to substrate 2. Alternatively, or in addition, back 32 may include one or more tangs 56, 57 to further prevent rotation of first portion 20 relative to substrate.

First Portion

First portion 20 may include a hook 22 extending from a base 24, the base 24 having a top 26, bottom 28, a first front surface 30, second front surface 36, rear surface 32 and sides 34. First front surface 30 and second front surface 36 may be generally planar and generally parallel to substrate 2. In addition, base 24 may be generally oblong and may have a height greater than a maximum width. Moreover, first front surface 30 may have an opening 46 for receiving fastener 6.

Hook 22 may extend from bottom 28 of base 24 to form a throat having a width T between hook 22 and base 24. Bottom of hook 22 may extend generally perpendicular to rear surface 32 of base 24 and then turn to extend outward and upward. Similarly, bottom 38 of throat may roll downward and outward to allow for a larger spacing between hook 22 and base 24 while disguising the size of the opening, making hook 22 appear smaller. Hook 22 may extend to an enlarged end or bulb 40 that may be wider than a portion of hook 22 proximate bulb 40 in order to help retain objects on hook 22 and prevent them from becoming dislodged easily. To further aid in this function, hook 22 may have a button 42 protruding from an inward-facing surface of bulb 40, and button 42 may be shaped to retain items hung on hook, e.g., by having a broad bottom substantially perpendicular to mounting surface against which items may bear.

Turning to FIGS. 2A-2B, first portion 20 may have a groove 44 between first front surface 30 and second front surface 36. Groove 44 may be generally perpendicular to both surfaces and may extend along a portion of a perimeter of second front surface 36 and substantially across a width of base 24. The portion of the perimeter of second front surface 36 that generally tracks groove 44 may be parabolic or bell shaped, coming to a rounded apex at top 37 of second front surface 36.

First front surface 30 may have an opening 46 for receiving fastener 6. Opening 46 may be spaced between top 37 of second front surface 36 and top 26 of first front surface 30 and may be generally aligned on axis 8. Opening 46 may have a recess 48 for receiving a head of fastener 6 so that the underside of the head preferably lays recessed with respect to first front surface 30, allowing for better engagement between first portion 20 and cover 60. Alternatively, head of fastener 6 may protrude slightly from first front surface 30, with recess 48 allowing for the head of fastener 6 to be at least partially recessed relative to the first front surface. Shear loading on hook 22 may be preferable than a bending moment component of an applied load since friable substrates have larger shear loading capacities as compared to bending moment capacities, and higher shear loading may be accomplished by increasing vertical spacing between applied load on hook 22 and fastener 6 in opening 46.

At least a portion of sides 34 may extend in a generally axial direction. This generally axial portion 35 of sides 34 may extend along a height of base 24, generally between opening 46 and bottom 38 of throat. Rear surface 32 of base 24 further may include one or more notches 50 proximate upper ends of generally axial portions 35 for receiving ears 74 (discussed below). Notches 50 may appear generally triangular when viewing rear surface 32.

Turning to FIG. 2C, first portion 20 may include an angled face 90 between front 30 and top 26. Angled face 90 may be angled from front 30 by between about 25 degrees and about 40 degrees, preferably between about 30 degrees and about 40 degrees, and in one embodiment, about 33 degrees. In addition, angled face 90 may serve as a ramp for engaging support rib/cam member 84 on cover 60 and guiding and aligning cover 60 as cover 60 is installed.

During mounting, anchor 4 is driven into substrate 2, and fastener 6 is inserted through opening 46 and into bore of anchor 4. Oftentimes, a user will not drive a fastener level such that when the head of the fastener contacts the recess, the first portion likely will not be mounted flush with substrate 2, leading to poor engagement between the rear surface 32 and substrate 2.

It surprisingly was found that a raised lobe 52 protruding rearward from rear surface 32 may alleviate this situation. Raised lobe 52 may extend between an upper surface that generally is aligned with top 26 along arch 58 and a bottom 54 that may be generally normal to axis 8. Bottom 54 further may be spaced from opening 46 so that when anchor 4 is installed in substrate 2 and first portion 20 is located so as to align opening 46 with bore of anchor 4, there is a clearance between the head of anchor 4 and bottom 54. When fastener 6 is driven through opening 46, raised lobe 52 may contact substrate 2 first, causing first portion 20 to bear against substrate 2 and not anchor 4, biasing or camming rear surface 32 and slightly compressing bottom 28 against substrate 2. Preferably, lobe 52 is tall enough to cam bottom 28 of first portion 20 against substrate 2 but not so tall that if the installer over-installs fastener 6, they will distort first portion 20 to the point where cover 60 will not fit any longer.

Lobe 52 may have a thickness less than or equal to the thickness of base 24 at a point just below bottom 54 of lobe 52, i.e., top 26 that includes lobe 52 may be about twice as thick as this lower portion. Preferably, lobe 52 may be between about 25% and about 100% of this base thickness, still more preferably between about 30% and about 50%. Alternatively, lobe 52 may be between about $10/1000$" thick and about $1/10$" thick, preferably between about $50/1000$" and about $80/1000$".

In one embodiment, lobe 52 also may include a barb 92, as best seen in FIG. 2C. Barb 92 may be located on rear surface 55 of lobe 52, e.g., proximate bottom 54 of lobe. Barb 92 may embed in or be compressed into the surface of substrate 2 when first portion 20 is installed, thereby inhibiting both rotational and lateral movement of first portion 20 relative to substrate 2. When first portion 20 is fully installed, barb 92 may cooperate with tang or tangs (discussed below) to prevent rotation of hook system 10. Alternatively, barb 92 particularly may be useful in the event bottom 28 of first portion 20 is spaced away from substrate 2 such that tangs are not engaged with substrate 2.

Barb 92 may only need to penetrate substrate 2 a small amount to provide sufficient resistance. As such, barb 92 may be extend from lobe 52 between about $5/1000$" and about $1/16$", preferably between about $10/1000$" and about $1/32$". Barb 92 also may be about twice as tall as it is deep. In addition to providing rotational and lateral movement resistance, the small size of barb 92 may allow it to embed in a plurality of substrates of varying hardness, including friable materials such as drywall and more rigid materials such as wooden hollow-core doors.

In addition to mounting misalignment, first portion 20 may deform slightly during installation. The upper lobe area initially may bear on substrate 2 as fastener 6 is installed. Tightening of fastener 6 against recess 48 may cause first portion 20 to bow slightly concavely or otherwise deform when viewed from the front. In order to minimize and control the effects of any potential deformation, back 32 of first portion 20 may include stopper pad 59 below fastener opening 46 to provide a second surface rearward of back 32 to bear against substrate 2. The degree of flexure or deformation may vary due to several factors, including the width, height and depth of the hook, the location of opening 46 relative to lobe 52, the amount of force applied to first portion 20 via fastener 6 during installation, and the degree of misalignment of the first portion and/or fastener 6. The combination of upper lobe 52 and stopper pad 59 has been found to control this deformation and make it more predictable, leading ultimately to better engagement of first portion 20 and cover 60.

Stopper pad may be formed when the first portion is created, e.g., it may be cast or molded when the remainder of the first portion 20 is cast or molded. The stopper pad 59 may be generally oblong and may extend substantially along a width of first portion, e.g., at least about half the width. Additionally, depth of stopper pad 59 from back 32 may taper from top of stopper pad 59 to bottom. Because first portion 20 may bow during installation, this taper may allow stopper pad 59 to rest generally flush against substrate 2.

In the embodiment shown in FIGS. 2A and 3A, top of stopper pad 59 may extend between about $5/1000$" and about $50/1000$" from back 32, preferably between about $10/1000$" and about $30/1000$", and in one embodiment about $12/1000$". In other embodiments, e.g., in larger hooks, top of stopper 59 may extend about $17/1000$" or about $27/1000$". Because of taper, bottom of stopper pad 59 may extend between about $4/1000$" and about $30/1000$", preferably between about $7/1000$" and about $25/1000$", and in one embodiment, about $8/1000$". In other embodiments, e.g., in the larger hooks described above, bottom of stopper 59 may extend about $13/1000$" or about $23/1000$". As set forth in each of these embodiments, stopper pad 59 may taper about $4/1000$" from top to bottom.

Stopper pad 59 may be spaced from fastener opening 46 by a distance large enough to provide clearance for head of anchor 4 in case the head of anchor 4 is not installed flush against substrate 2. In one embodiment, the distance between the center of fastener opening 46 and center of stopper pad 59 may be between about $1/8$" and about 1", preferably between about $1/4$" and about $1/2$", and in one embodiment about 0.34".

Rear surface 32 further may have at least one tang 56 aligned generally axially and protruding rearwardly. Tang 56 may be wedge-shaped, with a base having a thickness and coming to a point or line in order to allow tang 56 to be inserted into substrate 2. Tang 56 may cooperate with fastener 6 to provide two points of contact with substrate 2 so as to inhibit rotation of hook system 10. Although any two points on rear surface 32 should work, tang 56 preferably may be located proximate bottom 28 and generally aligned with axis 8. Since bottom 28 of rear surface 32 may be biased toward substrate 2 due to interaction of lobe 52 with substrate 2 and, conversely, portions of rear surface 32 higher up may be spaced further away from substrate 2 than bottom 28, placing tang 56 higher on rear surface 32 may otherwise require tang 56 be longer in order to ensure that tang 56 embeds in substrate 2, requiring more material to form first portion 20.

As seen in FIG. 5, first portion 20 may include a plurality of tangs 56, 57. In this embodiment, tangs 56, 57 may be generally aligned and may be generally equidistant from a centerline of first portion 20. Alternatively, tangs 56, 57 may have other configurations, e.g., being generally aligned along centerline. Bases of tangs 56, 57 may be in recess 96, which may have several benefits. For example, recess 96 means less material is required to form first portion 20, reducing material costs. In addition, the depth of embedding of tangs 56, 57 may be determined by the hardness of substrate 2. As such, recess 96 may allow bases of tangs to be larger and, therefore, stronger, while minimizing the amount of the tangs protruding beyond back 32 of first portion 20. For example, recess may be between about 10/1000" deep and about 1/16" deep, preferably between about 20/1000" and about 40/1000", and in one embodiment, about 30/1000". In addition, tangs 56, 57 may have a height from recess 96 of between about 10/1000" and about 1/8", preferably between about 1/32" and about 1/8", and in one embodiment, about 1/10".

Turning to FIG. 6, an alternative embodiment may include alternative tangs 56' and second tang 57'. As with the embodiment of FIG. 5, bases of tangs 56', 57' may be located in recess 96. However, in this embodiment, alternative second tang 57' may be significantly larger than tang 56'. Alternative second tang 57' may be beneficial for embedding in a friable substrate such as drywall, but may be too large to embed in a harder substrate such as a hollow core door. In the latter case, alternative second tang 57' may be frangible proximate its base and may be broken off to allow first portion 20 to seat properly against substrate 2. It is possible that alternative second tang 57' may not break cleanly and, as such, recess 96 may allow any broken remnants to avoid sticking above back 32. Once alternative second tang 57' is removed, tang 56' then may be embedded in the substrate 2. In this embodiment, tang 56' may have a height from recess 96 of between about 10/1000" and about 1/8", preferably between about 1/32" and about 1/8", and in one embodiment, about 50/1000". Alternative tang 57' may have a height from recess 96 of between about 1/16" and about 1/4", preferably between about 1/8" and about 3/16", and in one embodiment, about 15/100". Additionally, bases of tangs may have several shapes. For example, tangs 56, 56' and 57 both may have generally square bases, while alternative tang 57' may be generally rectangular, having a height larger than a width.

Turning now to FIG. 4, first portion 20 may include a cavity 98 extending inward from recess 96. Cavity 98 may extend beyond front 30, e.g., to a point generally aligned with bottom of throat 38. Cavity 98 may remove mass from first portion 20, making hook system 10 lighter and allowing system 10 to support an object with greater mass. In addition, less material needed to make first portion 20 due to cavity 98 may translate into lower material and manufacturing costs.

As seen in FIGS. 3A-3D, first portion 20 may include one or more female detents 31, 33 to enhance engagement of first portion 20 with cover 60 by interfacing with male detents 81, 83 on cover 60. Alternatively, first portion 20 may include male detents and cover 60 may include female detents, or first portion 20 may include a combination of male and female detents, with cover 60 including the respective female and male detents. Detents 31, 33 may be located in groove 44, more specifically as recessed portions of rear face 39 of second front surface 36. Detents 31, 33 may have a generally uniform depth relative to rear face 39 or may taper from a deeper upper end to a shallower lower end. Top of detents 31, 33 may include a stepped or rounded, convex surface transition from detent 31, 33 to rear face 39. This surface also may be a bearing surface for allowing male detents 81, 83 to snap in place.

Cover

Returning to FIGS. 2A-2B, hook system 10 further may include a cover 60 having a top 62, bottom 64, front 66, back 68 and outer side 70 and inner side 71. Outer side 70 may be substantially arcuate to form a continuous surface from bottom 64 to top 62 and back to bottom 64. In addition, front 66 may include a notch 76 proximate top 62. Notch 76 may be used to assist in removing cover 60 from first portion 20, e.g., by accepting the tip of a screwdriver to which an upward force may be applied. Cover 60 also may have a complementary support rib 84 on back 68 and generally aligned with axis 8. Support rib 84 may add additional strength to cover 60 to avoid damage when a force is applied to notch 76 and, as discussed above, to provide guidance along angled face 80 during installation of cover 60.

As can be seen in FIGS. 2A, 3A, 7B, and 8B back 68 of cover 60 further may have features for guiding cover 60 onto, and keeping cover 60 aligned with, first portion 20. For example, rear edge 61 may be angled inward an amount θ with respect to axis 8 or substrate 2 from top 62. Angle θ may be between about 1 degree and about 10 degrees, preferably between about 1 degree and about 5 degrees, still more preferably between about 1 degree and about 3 degrees, and in one embodiment about 2 degrees. This angling may extend along rear edge 61 to a point between about 1/3 and about 2/3 the height of cover from top 62, at which point rear edge 61 may extend generally aligned with axis 8 or may angle outward away from axis, until bottom 63 of rear edge, ending in taper 65 that angles inward an amount β. Angle β may be between about 5 degrees and about 15 degrees, preferably between about 7 degrees and about 11 degrees, and in one embodiment, about 8 degrees. During installation, taper 65 may allow cover 60 slide along substrate 2 to aid in aligning cover 60 with first portion 20 without digging into substrate 2, as seen in FIG. 7A.

Turning to FIGS. 8A-8C, when cover 60 is in a fully installed configuration, angle θ may cause rear edge 61 to be spaced from substrate, preventing rear edge 61 from scuffing or digging into substrate 2. If rear edge 61 angles back away from axis 8, bottom 63 of rear edge may bear against or compress into the face of substrate 2. Substrate 2 may provide a spring action effect between the detents 31, 33 on first portion and detents 81, 83 on cover by creating a resistive force pushing back against cover.

In addition, cover 60 may include a tongue, which may be divided into first tongue component 80 and second tongue component 82 that operatively engage groove 44 on first portion 20. Cover 60 may include a space between first and second components 80, 82 to form a channel or recess 72. In the event that the head of fastener 6 does not lay flush with or below first front surface 30 but extends outward beyond first front surface 30, head of fastener 6 may pass through opening into recess 72 when cover 60 is placed over first portion 20. Additionally, back 68 may include a second recess 73 within first recess 72 to provide even greater clearance for head of fastener 6. Top of second recess 73 may be generally arcuate and may align with top of top of fastener opening recess 48 on first portion when cover 60 is installed.

Tongue on cover 60 may include male detents 81, 83, as best seen in FIGS. 1, 2A, and 2B. Detents 81, 83 may be spaced outward from first and second tongue components and are located so as to engage detents 31, 33 on first portion 20 when cover 60 is installed. Upper portions of detents 81, 83 may extend outward from first and second tongue components, and detents 81, 83 may taper toward first and second tongue components along the length of detents 81, 83. As such, the outer edges of detents 81, 83 may act as ramp surfaces to guide detents 81, 83 into a secured position inside detents 31, 33. Upper portions of detents 81, 83 may extend outward from first and second tongue components 80, 82 by between about 1/1000" and about 10/1000", preferably between about 1/1000" and about 5/1000", and in one embodiment about 2/1000".

Cover 60 may have a thickness less than thickness of base 24 of first portion 20. Specifically, when installed, at least base 24 and raised lobe 52 may bear against mounting substrate, but rear edge 61 of cover may be spaced from substrate, except for bottom 63, as best seen in FIGS. 8A and 8C. These figures also illustrate that, when installed, front 66 of cover 60 is preferably closer to substrate than second front surface 36 of first portion 20. This slight indentation or recess of cover 60 relative to second front surface 36 may prevent snagging or accidental dislodgement of cover 60 when removing an object from hook 22.

Cover 60 additionally may include one or more ears 74 proximate top 62 of back 68. Ears 74 may be substantially symmetrically located on opposite sides of axis 8. In addition, ears 74 may be shaped substantially similarly to, or may be smaller than, notches 50 on first portion 20 to allow ears 74 to operatively engage notches 50 when cover 60 is placed on first portion 20. For example, as seen in FIG. 2A, ears 74 are generally triangular and match the generally triangular shape of notches 50.

Staying with FIG. 2A, cover 60 further may have one or more guides 78 on each side of axis 8 for interfacing with generally axial portions 35 on first portion 20. Preferably, cover 60 has a plurality of guides 78, still more preferably about three guides 78, on each side of axis 8. In order to interface with generally axial portions 35, outer ends of guides 78 preferably are spaced substantially equidistantly from axis 8.

One or both of first portion 20 and cover 60 may receive a finishing treatment such as plating or painting/powder coating. These treatments add thickness to the surfaces on which they are applied, e.g., between about $1/1000"$ and about $2/1000"$ for plating and between about $3/1000"$ and about $6/1000"$ for powder coating. The dimensions described above may represent raw distances or clearances, which may be altered slightly by these finishing treatments. Preferably, however, both the first portion 20 and cover 60 receive the same finishing treatment, so that relative dimensions between these elements may remain generally uniform after finishing. In addition, because plating or painting may build up the detent members, thereby decreasing the amount of interference fit, similar finishing on both the first portion and cover may result in the relative location of the detents remaining generally constant. In this case, even the reduced interference fit may still suffice to create positive engagement between the detent members and, by extension, between the first portion and the base.

Anchor

Hook system 10 further may include a drywall anchor 4. Various types of anchors may be used with system 10, for example, anchors sold under the trademarks E-Z ANCOR, STUD SOLVER, MINI STUD SOLVER, TWIST-N-LOCK or TAP-N-LOCK, see commonly assigned U.S. Pat. No. 4,601,625 and U.S. patent application Ser. Nos. 10/844,706, 11/832,311 and 12/167,742 to Ernst, et al., the contents of which are incorporated herein by reference. Anchor 4 may be a self-drilling drywall anchor capable of penetrating studs, and may have the configuration shown in FIGS. 15-16.

For example, anchor 4 may having an elongated body 312 with an axis 306, an axial bore 308 adapted to receive an elongated mounting fastener 4, a flared end 314 having torque transmitting surfaces 315 therein, a proximal portion 318 proximate flared end 314, an intermediate portion 320, a distal portion 322, and a drilling tip 316 generally opposite flared end 314, wherein proximal portion 318 has a threaded exterior, such as drywall gripping threading 319, having a root 326, a crest 327 with a crest diameter DC, and a thread height DH, intermediate portion 320 has a threaded exterior, such as member gripping threading 321, having a root 328, a crest 329 with a crest diameter MC substantially smaller than drywall gripping threading crest diameter DC, and a thread height MH substantially smaller than drywall gripping thread height DH, and distal portion 322 has a threaded exterior, such as drilling threading 323, having a root 330 that tapers toward drilling tip 316, a crest 331 with a crest diameter TC substantially smaller than drywall gripping threading crest diameter DC, and a thread height TH substantially smaller than drywall gripping thread height DH.

In addition, anchor 4 may include splines 344 in bore 308 of anchor 4 for engaging with mounting fastener 6. Mounting fastener threading 405 taps mating threads 345 into splines 344 so that mounting fastener 6 is threadingly engaged with splines 344, and hence with anchor 4. Splines 344 also add structural support to anchor 4 so that body 312 of anchor 4 can withstand higher torsion forces when driven through drywall 2 and support member 5. Splines 344 may extend along a length of bore 308 and may preferably extend substantially along the entire length of bore 308.

Anchor 4 further may have an additional, tertiary thread 390 proximate flared end 314. Additional thread 390 may have a terminal end 391 circumferentially spaced from a terminal end 317 of proximal portion threading 319. Additional thread 390 further may have a leading end 392 generally circumferentially aligned with a terminal end 317 of proximal portion. Preferably, terminal end 391 of additional thread 390 may be offset from terminal end 317 of proximal portion threading 319 by between about 120 and about 240 degrees, preferably between about 150 and about 210 degrees, still more preferably about 180 degrees.

Offsetting additional thread 390 from proximal portion threading 319 means that a plurality of threads may be engaged in the substrate 2 when anchor is fully installed. Moreover, offsetting of threads may cause proximal portion threading 319 and additional thread 390 to be generally diametrically opposed such that, when installed, there is at least one diameter at which threads of anchor 4 engage substrate 2 on both sides of anchor 4, resulting in a more even distribution of force during loading and a stronger, more stable engagement of anchor 4. Without additional thread 390, when anchor 4 is installed in a thin substrate such as the face of a hollow core door, proximal portion threading 319 may either not engage face or may only engage face on one side of anchor 4, resulting in a weaker, less stable engagement and, subsequently, a lower holding strength.

The substrate 2 may be a friable material chosen from one of several friable materials used in construction. An example of the friable material is gypsum based drywall, such as the gypsum drywall sold under the trademark SHEETROCK by United States Gypsum. Drywall typically has a thickness T of ½ inch or ⅝ inch, but it can be obtained in other thicknesses, such as ⅜ inch.

Typically, friable materials such as drywall are mounted to a member, such as a wood structural support member, plywood, or another friable material, such as another layer of drywall. The member can be a support member, such as a wood support member, for example a 2×4 stud or the like, evenly spaced from other wood studs, e.g. every 16 inches, or a metal support member, such as a steel support stud. Support members are substantially more resistant to pullout than drywall because they are much less likely to break apart.

Alternatively, the substrate 2 may be a semi-rigid material. For example, it may be a thin piece of solid wood, fiberboard, plywood, or multiple materials having a veneer coating and may be, e.g., one side of a hollow core door. The semi-rigid material may come in a variety of thicknesses, but generally may be between about 1/16 inch and about ⅛ inch.

Fastener

Mounting fastener 6 is preferably a threaded fastener, such as a mounting screw, having an elongate shank 434 with a head 435 at one end and a tip 436 at the other. Shank 434 of mounting fastener 6 includes threading 405 which engages with interior bore 308 of anchor 4. Threading 405 of mounting fastener 6 can be of a standardized thread form, such as Unified Coarse (UNC) or Unified Fine (UNF) threading, or threading 405 can be of a specialized thread form. Mounting fastener 6 can be a standard #6, #7 or #8 UNC screw, wherein head 435 has a Phillips recess, and a total elongate length FL of between about ½ inch inches and about 2 inches or more, preferably about 1¼ inches. Mounting fastener 6 can have a thread density of between about 8 threads per inch and about 18 threads per inch, preferably about 15 threads per inch.

Various Sizes of First Portion and Cover

Hook system 10 may come in variety of sizes for multiple applications, e.g., small, medium and large sizes. Each variation may employ a similarly sized anchor 4 and fastener 6 but may have differently sized first portions 20 and covers 60. For example, a "small" first portion 20 may have a width between generally axial sides 35 of between about ½" and about 1", preferably between about ⅝" and about ⅞", still more preferably about ¾", and in one embodiment about 0.745". First portion 20 also may have a height between about 2" and about 3", preferably between about 2¼" and about 2¾", still more preferably about 2½", and in one embodiment, about 2.43". In addition, first portion may have a maximum throat width, T, of between about ⅜" and about 1", preferably between about ½" and about ¾", and in one embodiment about 0.52". Moreover, first portion may have a thickness from first front surface 30 to rear surface 32 of between about 1/16" and about 3/16", preferably between about 1/16" and about ⅛", and in one embodiment about 0.1" and further may have a thickness between first front surface 30 and rear surface of lobe 52 of between 3/32" and about ¼", preferably between about ⅛" and about 3/16", and in one embodiment about 0.157". Additionally, tang 56 may have a depth of between about 1/16" and about 3/16", preferably between about 1/16" and about ⅛", and in one embodiment about 0.92".

A "medium" version of system 10, may include first portion 20 having a width between generally axial sides 35 of between about ¾" and about 1½", preferably between about ⅞" and about 1¼", still more preferably about 1", and in one embodiment about 1.076". First portion 20 also may have a height between about 2½" and about 3½", preferably between about 3" and about 3¼", still more preferably about 3⅛", and in one embodiment, about 3.18". In addition, first portion may have a maximum throat width, T, of between about ¾" and about 1½", preferably between about ⅞" and about 1⅛", and in one embodiment about 1.01". Moreover, similar to the "small" version, first portion 20 may have a thickness from first front surface 30 to rear surface 32 of between about 1/16" and about 3/16", preferably between about 1/16" and about ⅛", and in one embodiment about 0.1". First portion 20 further may have a thickness between first front surface 30 and rear surface of lobe 52 of between 3/32" and about ¼", preferably between about ⅛" and about 3/16", and in one embodiment about 0.164". Additionally, tang 56 may have a depth of between about 1/16" and about 3/16", preferably between about 1/16" and about ⅛", and in one embodiment about 0.92".

A "large" version of system 10 may include first portion 20 having a width between generally axial sides 35 of between about 1" and about 1¾", preferably between about 1¼" and about 1½", still more preferably about 1 5/16", and in one embodiment about 1.318". First portion 20 also may have a height between about 3½" and about 4½", preferably between about 3¾" and about 4¼", still more preferably about 4", and in one embodiment, about 3.93". In addition, first portion 20 may have a maximum throat width, T, of between about 1¼" and about 2", preferably between about 1½" and about 1¾", and in one embodiment about 1.62". Moreover, similar to the "small" and "medium" versions, first portion 20 may have a thickness from first front surface 30 to rear surface 32 of between about 1/16" and about 3/16", preferably between about 1/16" and about ⅛", and in one embodiment about 0.1". First portion 20 further may have a thickness between first front surface 30 and rear surface of lobe 52 of between 3/32" and about ¼", preferably between about ⅛" and about 3/16", and in one embodiment about 0.183". Additionally, tang 56 may have a depth of between about 1/16" and about 3/16", preferably between about 1/16" and about ⅛", and in one embodiment about 0.92".

Single-bodied hooks that rely on an adhesive backing for engagement with a substrate such as drywall also may be produced in a variety of sizes. For small, medium and large versions of these hooks, holding strengths of about 1 lb., about 3 lb. and about 5 lb., respectively, have been claimed. While sizing of these hooks may not align identically with the various sizes of hook system 10 described above—e.g., a "large" adhesive-backed hook may be relatively comparable in size to the "medium" hook described above, each of the small, medium and large hooks of the present invention may have a holding strength of about 100 lbs., or significantly higher than the strength of the adhesive-backed hooks. In addition, the components of system 10, including first portion 20 and cover 60 may be fabricated in a variety of ways, including using die cast zinc or a zinc alloy such as Zamak 1 or 3 or injection molded plastic. Additionally or alternatively, first portion 20 may include an adhesive backing on rear surface 32 to support first portion 20 and cover 60 against substrate 2.

Second Embodiment

Turning to FIGS. 9-11, a second embodiment of hook system 110 is shown. Elements common to the first embodiment share the same reference numerals but include a 100s prefix.

Like the first embodiment, system 110 may comprise a first portion 120, a cover 160, an anchor 4 and a fastener 6 and may have features similar to those described above. Cover 160 may be substantially similar to cover 60, including male detents 181, 183 on respective tongue components 180, 182, recess 172 in back 168, a plurality of ears 174 disposed on opposite sides on axis 8, a plurality of guides 178 also disposed on opposite sides of axis 8 and having ends generally vertically aligned, and tapers 165 proximate bottoms 163 of rear edge 161. Cover 160 also may have an angled rear edge 161 with angles similar to those described for the first embodiment above, such that most of rear edge 161 may be spaced from substrate when installed, with bottoms 163 bearing against substrate. First portion 120 may include a stopper pad 159, a raised lobe 152 with barb 192, tangs 156, 157 in recess 196 on back of base 124, channel 198 in recess 196, and female detents 131, 133 on rear face 139 of second front surface 136.

As can be seen in FIG. 9, first portion 120 may include a plurality of hooks 122, 123 extending from bottom 128 of base 124. Hooks 122, 123 may extend away from base 124 at substantially symmetrical angles with respect to axial plane 108 so as to provide hooks for hanging multiple articles or to provide increased surface area to hang a larger or bulkier item such as a robe, e.g. Portions of hooks 122, 123 proximate bottom 128 of base 124 may be narrower than similar portions in the first embodiment so as to make room for both hooks. However, due to their separation from each other, and in order to support larger items, bulbs 140, 141 of hooks 122, 123 may be larger than bulb 40, i.e., generally semicircular but with a larger diameter.

Third Embodiment

Turning now to FIGS. 12-14, a third embodiment of the hook system is shown. As with the second embodiment, elements common to the first embodiment share the same reference numerals but here include a 200s prefix.

In this embodiment, hook system 210, like system 110, may include a first portion 220, a cover 260, an anchor 4 and a plurality of fasteners 6 and may have features similar to those described above. First portion 220 may include a stopper pad 259, a raised lobe 252 with barb 292, tangs 256, 257 in recess 296 on back of base 224, channel 298 in recess 296, and female detents 231, 233 on rear face 239 of second front surface 236.

Cover 260 may include male detents 281, 283 on respective tongue components 280, 282, recess 272 in back 268, a plurality of ears 274 disposed on opposite sides on axis 8, a plurality of guides 278 also disposed on opposite sides of axis 8 and having ends generally vertically aligned, and tapers 265 proximate bottoms 263 of rear edge 261. Cover 260 also may have an angled rear edge 261 with angles similar to those described for the first embodiment above, such that most of rear edge 261 may be spaced from substrate when installed, with bottoms 263 bearing against substrate.

Unlike the second embodiment, instead of projecting outwardly and upwardly from base 224 at bottom 228, hook 222 of the third embodiment may extend downwardly and outwardly from base 224, before turning upward to a distal end 239 having a bulb or knob 240. Knob 240 may extend vertically to a point higher than end of hook 222 proximate base 224 to hold objects on hook 222 without sliding off but alternatively may extend higher or lower.

In this embodiment, a plurality of interchangeable covers 260 may be supplied, which may provide system 210 with greater functionality. For example, a first cover that is similar in shape to covers 60, 160, i.e., substantially unadorned may be applied. In this configuration, system 210 may be particularly well suited to serve as a key holder or hat hook. Alternatively, system 210 may include a second cover 260' similar to cover 60 but with an additional hook 223 extending therefrom. Hook 223 may be generally axially aligned and extend outward and/or upward from cover 260' to a distal end extending beyond distal end of hook 222. As such, system 210 may allow for the hanging of multiple objects, e.g., as both a key holder and a wardrobe hook system.

Each of the embodiments described above may include additional openings for receiving other fasteners. In addition, the back of each first portion may be generally planar, i.e., without one or more of the tangs, stopper pad and/or raised lobe, although the backs still may include notches for receiving ears on the cover.

Figure 22:
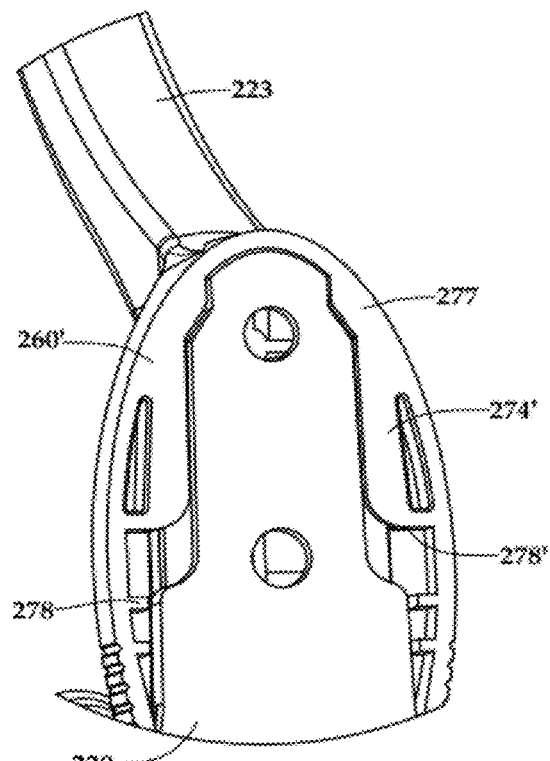
FIG. 22 is a rear, perspective view of the base portion of FIG. 21 coupled to another embodiment of a cover portion.
Figure 23:
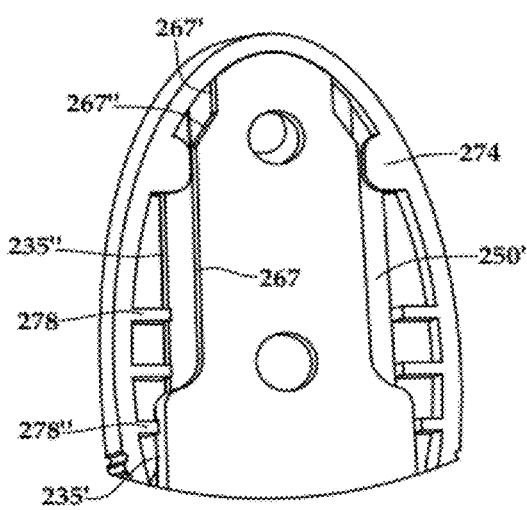
FIG. 23 is a rear, perspective view of the base portion of FIG. 21 coupled to still another embodiment of a cover portion.
Figure 24:
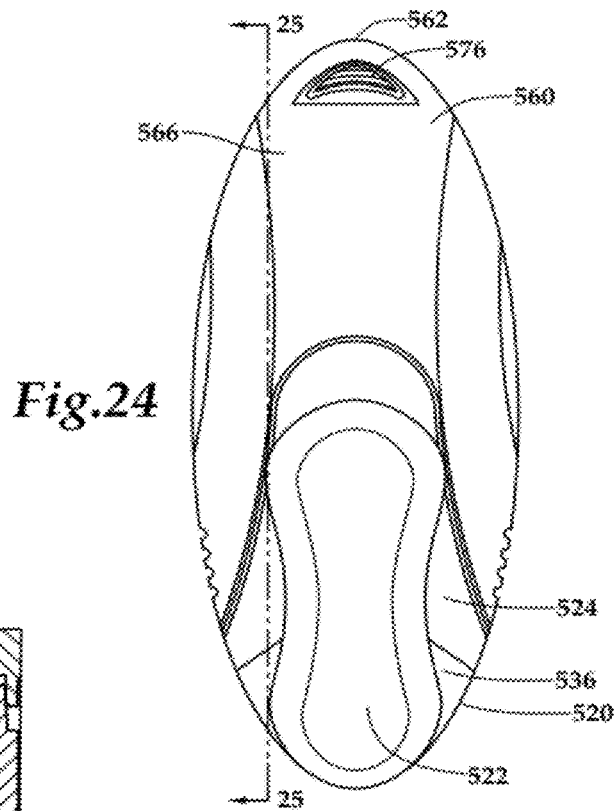
FIG. 24 is a front view of an assembled holder system.

Modifications to the third embodiment may be seen in FIGS. 21-23. Turning to FIG. 21, base 220 may include a second fastener opening 247 to complement first fastener opening 246. First opening 246 may be disposed proximate a top 226 of base, e.g., at a location substantially level with ears 274 of cover 260 when cover 260' is installed. Second opening 247 may be more centrally located along a height of base 220, e.g., generally aligned with a bottom of notches 250.

Cover 260' with additional hook 223 may benefit from a tighter, more consistent fit with base 220, which may be achieved in one or more manners. For example, notches 250' may be less deep than in the other embodiments shown in the figures, i.e., base 220 may be thicker in notch region, which may allow cover 260' to more securely contact front surface 236 of base and may allow ears 274 to contact more of notches 250'.

Notches 250' also may be longer than notches 250 shown in FIG. 14. As seen in FIG. 21, e.g., notches 250' may be between about ⅕ and about ⅔ a height of back portion 232 of base 220, preferably between about ¼ and about ½, and in one embodiment, about ⅓ the height. As such, base 220 may be able to support and withstand higher cantilevered forces applied by article supported by additional hook 223.

Notches 250' also may include a plurality of notch surfaces such as first notch surface 251 and second notch surface 253. First notch surface 251 may be generally parallel to front surface 236 and/or back 232 of base 220 and may be disposed closer to back 232 than second notch surface 253, which also may be generally parallel to front surface 236 and/or back 232. First notch surface 251 may be substantially longer than second notch surface 253, e.g., first surface 251 may be about 80% and second surface about 20% of a total length of notch 250'. Due to differing heights, there also may be a step down from first surface 251 to second surface 253. Step may be generally perpendicular to one or both of surfaces 251, 253 but preferably is inclined with respect to both surfaces, forming a ramp-like surface.

In addition, notch 250' may follow a generally linear or planar path along its length, having a side surface 267 that is generally vertical, although side surface also may taper outwards from top to bottom. Staying with FIG. 21, notch 250' also may include an inset portion 249 at an upper end that may extend inwards from second notch surface 253 towards plane of symmetry 208. Turning to FIG. 23, like the rest of notch 250, inset portion 249 may have an inner side surface 267' that is generally vertical and may be generally perpendicular to one or both of a primary surface of inset portion 249 and back 268. Inset portion 249 also may have a bottom side surface 267" that may be angled downwards and outwards, with inner side and bottom side have substantially similar lengths.

Increased length of notch 250' may affect configuration of sides 234 of base 220, particularly generally axial portion 235 of sides 234. Generally axial portion 235 may include a first portion 235' extending at a greater width than the rest of the generally axial portion. As seen in FIG. 21, first portion 235' may extend between a bottom of notch 250' and protrusions 221. Conversely, generally axial portion 235 may include a second portion 235" that may extend at a narrower width than first portion 235'. Second portion 235" may extend alongside notch 250' and may have a common edge with notch 250'. As such, base 220 with a plurality of notch surfaces 251, 253 may therefore be employed with a variety of different covers having different ear patterns.

Cover 260' similarly may be reconfigured to account for modifications to base 220. Turning to FIG. 22, increased length of notch 250' may allow for longer ears 274'. Ears 274' may be configured to operatively engage notch 250', i.e., a thickness of ears 274' may be modified to account for reduced depth of notch 250' at first surface 251. Preferably, however, thickness of ears 274' may remain unchanged, which may create a tighter interface with the thicker portion of notch 250' at first surface 251. This tighter interface may be useful in all applications, although it may have particular benefits with cover 260' includes one or more hooks 223, such that cover 260' may remain stationary even when subjected to repeated loading and unloading forces.

Ears 274' may have an inner edge configured to align with and engage side surface 267 on base 220. Spacing between ears 274' may be substantially similar to distance between side surfaces 267, although spacing may be slightly greater to allow for clearance or slightly smaller to create a slight interference fit and a tighter connection.

Staying with FIG. 22, ears 274' also may include a tab or portion 277 configured to fit into inset portion 249 of notch 250', e.g., portion 277 may be shaped similar to inset portion 249, including having a generally vertical side portion and a bottom portion that may be tapered.

Guides 278 also may be modified to account for changes to base 220. As seen in FIG. 22, e.g., ears 274' preferably may extend at least as low as a first guide 278' and may be formed in a generally unitary fashion with the first guide, such that a bottom of ear 274' may be generally aligned with bottom of first guide 278'. This relationship between ear 274' and first guide 278' may provide additional structural support to the ear 274'. Turning to FIG. 23, additionally or alternatively, at least one guide 278" may be shortened and extend inward a lesser amount than the other guides to allow for increased width of the first portion 235' of generally axial portion 235.

When cover 260 is installed on base 220, preferably at least a portion of ear 274 or 274' extends downward a sufficient distance to bypass second notch surface 253 and rest on or otherwise engage first notch surface 251, which may allow for tighter engagement between base 220 and cover 260 and reduce rattle between pieces. Alternatively, with shorter ear 274, preferably substantially all of ear 274 rides in second notch surface 253. To remove this cover 260', the EZ Open procedures discussed below may be used, which may include tilting a lower portion of cover 260' away from base 220 before or at the same time as lifting cover 260' upwards. As the cover is lifted, ear 274 may slide into second notch surface 253, providing additional clearance for cover 260 to pivot.

Alternatively, if cover 260' includes a longer ear 274', such as in FIG. 22, cover 260' may be removed by lifting substantially vertically without tilting cover 260'. Because cover 260' with longer ear 274' likely also may include additional hook 223, this additional hook 223 may be grasped to pull cover 260' away from base 220.

Fourth Embodiment

Turning now to FIGS. 17-20, a further embodiment is shown. Elements may be similar to those of the previous embodiments, although elements in this embodiment have a 500s prefix and may be discussed in greater detail below. Although these figures show a single-leg hook and a base with side-by-side tangs, additional hook or tang configurations, including but not limited to the various configurations described in the embodiments above, are within the scope of this embodiment.

In this embodiment, second front surface 536 of base 520 may be substantially smaller than in previous embodiments, although base 520 still may include groove 544 between first and second front surfaces 530, 536. For example, whereas the groove in previous embodiments may have extended to a height higher than the top of the hook, in this embodiment, groove 544 may have a low point at its external edges proximate sides 534 that may be generally axially aligned with top of cavity 598, and an apex generally aligned with top of recess 596.

Cover 560 may include an inner side 571 similarly shaped to top 537 of second front surface 536 so that, as with the previous embodiments, inner side 571 and top 537 may align to form a generally continuous surface, although cover 560 may be recessed slightly from second front surface 536. In this embodiment, first and second tongue components 580, 582 may extend downward from back 568, so as to resemble tabs extending downward behind inner side 571 when viewing cover 560 from the front 566. Tongue components 580, 582 may be the distal ends of rails extending substantially the height of cover 560. Rails may have a generally rectangular cross-section. Preferably, however, rails may include a channel extending inward from back 568 so as to give channels a U-shaped cross-section. Removing material to form the channel may reduce the weight of cover 560 and the amount of material necessary to mold cover 560 and also may allow material flow and limit cooling issues or sink by avoiding a thick area of material.

Tongue components 580, 582 may be separated a distance sufficient to permit passage of fastener head 435 between them when cover 560 is being coupled to base 520. Tongue components 580, 582 preferably extend downward from inner side 571 by a distance generally equal to, or slightly less than, a depth of groove 544.

In this embodiment, stopper or shim pad 559 on back 532 of base portion 520 may be spaced proximate to fastener opening 546. Because anchor 4 includes bore 308 sized to receive fastener 6, flared end 314 of anchor 4 preferably has a larger diameter than bore 308 and, therefore, of fastener opening 546. As such, while still allowing for biasing of base portion 520 as described above with respect to other embodiments, pad 559 may bear against flared end 314 to eliminate any gap between flared end 314 and base portion 520. By keeping anchor 4 engaged firmly between substrate 2 and base portion 520, pad 559 may assist in preventing "jacking" of anchor 4 away from substrate 2 when fastener 6 is tightened, which may weaken connection between anchor 4 and substrate 2.

Turning now to FIGS. 17 and 18, system 510 may include further engagement structure to assist in holding base 520 and cover 560 together. For example, base 520 may include one or more bumps or protrusions 521 and one or more valleys or indentations 523 for interfacing with one or more respective valleys or indentations 575 and bumps or protrusions 579, respectively. System 510 may include a plurality of these respective protrusions and indentations, which may increase the connection between base 520 and cover 560 and may make that connection better balanced, e.g., by locating a protrusion and indentation on generally opposite sides of plane of symmetry 8 from another protrusion and indentation.

Staying with FIG. 18, protrusion 521 and indentation 523 on base 520 may be on sides 534 or, more specifically along generally axial portions 535, proximate bottom 528. Protrusion 521 may extend downward and outward from generally axial portion 535, and indentation 523 may extend downward and inward from protrusion. Both protrusion 521 and indentation 523 may include curved ramp surfaces to allow for sliding engagement with protrusion 579 and indentation 575 on cover 560. In addition, upper and lower ends of indentation 523 may extend outward substantially the same distance from plane of symmetry 8, although indentation 523 itself may not be generally symmetrical. Instead, in one embodiment, slope of indentation 523 from upper end to nadir may be steeper than slope from lower end to nadir. While still allowing for sliding engagement between base 520 and cover 560, this steeper slope may increase frictional forces necessary to separate base 520 and cover 560, resulting in better engagement. Interference or overlap between protrusions 521, 579 preferably may be between about 0.002" and about 0.006" so that the protrusions may encounter each other prior to the locked or unlocked positions while still allowing passage of protrusion 579 past protrusion 521.

Similarly, protrusion 579 and indentation 575 on cover 560 may be formed proximate bottom 563 of rear edge 561.

Protrusion 579 may extend upward and inward, i.e., toward axis of symmetry 8, from bottom 563, and indentation 575 may extend upward and outward, i.e., away from axis of symmetry 8, from protrusion 579. As with indentation 523 on base portion 520, indentation 575 on cover 560 may have its steepest slope proximate protrusion 579.

During installation, cover 560 may slide along generally axial portions 35 of base portion 520 until protrusion 579 encounters protrusion 521. Protrusions may be sized so as to increase frictional engagement between each other, but may not be so large as to inhibit sliding protrusion 579 past protrusion 521. With the application of additional force, protrusion 579 extends beyond protrusion 521 to settle into indentation 523, while protrusion 521 similarly settles into indentation 575. Reversing the direction of force reverses the process, causing protrusions 521, 579 to switch positions, uncoupling base 520 and cover 560.

EZ Open Features

Figure 25:
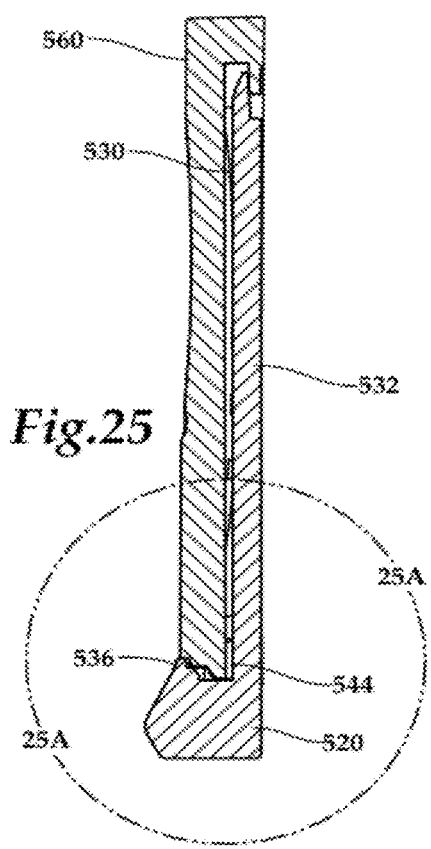
FIG. 25 is a section view through line 25-25 in FIG. 24.
Figure 25A:
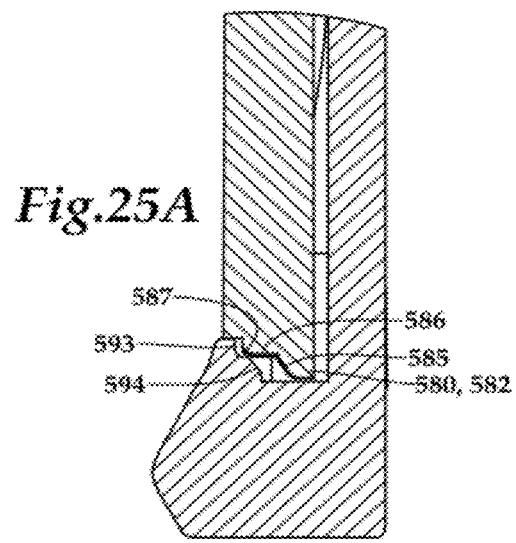
FIG. 25A is a detail view of detail A in FIG. 25.

Turning now to the section view of FIG. 25 and the detail view of FIG. 25A, holder may include features that assist in separating cover 560 from base 520. It may be desirable to remove cover 560 from base 520 by lifting cover 560 both upwards and away from base at the same time. As such, interfacing components of base 520 and cover 560 may include elements facilitating motion in these directions.

For example, groove 544 in base may be configured to receive one or more tongue components 580, 582 extending from cover. Each tongue component may include a forward face 585 angled downward, such that tongue components 580, 582 may be thicker at the top than at the bottom. Similarly, groove 544 may include a rearward facing, angled, forward face 594 that also may be angled downward. In one embodiment, faces 585, 594 of cover and base may be angled substantially the same amount, e.g., between about 120 degrees and about 140 degrees. As such, face 594 of base may form a ramp surface along which face 585 may translate when cover 560 is removed.

Because angled faces may permit easier motion between base and cover, one or both of base and cover may include a stop or other means for retaining cover 560 in a resting position with respect to base 520 and to prevent accidental dislodgement of cover 560. Retaining means may include a cessation of angled faces 585, 594 or a change in the angle of faces 585, 594. As seen in FIG. 25A, this change may result in the formation of a step 586 on cover and/or a step 593 on base. Steps 586, 593 may be generally mirror-images of one another, e.g., step 586 may protrude outward from cover 560 while step 593 may extend inward into base 520, although the opposite also is possible.

Angled face 585 and step 586 of cover 560 may be disposed across part and preferably an entire width of tongue component 580 (with similar elements on tongue component 582). Similarly, angled face 594 and step 593 of base 520 may be disposed against an entire width of groove 544, although, at a minimum, face and step preferably overlie at least areas in communication with tongue components 580, 582 when base 520 is coupled to cover 560.

Steps 586, 593 may be substantially similarly sized and shaped to increase interfacing between base 520 and cover 560. Alternatively, while steps 586, 594 may be similarly shaped, step 586 may be sized to create clearance with respect to base 520. For example, step 586 on cover may be shallower than step 593 on base, which may permit a larger amount of cover 560 to interface with base 520. Conversely, step 586 may extend laterally a greater amount than step 593, which may help ensure that cover 560 interfaces more securely between first front surface 530 and second front surface 536 of base 520.

Steps 586, 593 may have a height between about 25% and about 75% that of groove 544, preferably between about 40% and about 60% the height. Additionally, while only a single step is shown, system 510 may include additional retaining means, e.g., additional steps.

Step 586 also may include a radiused edge 587, which may assist in removing tongue components 580, 582 from groove 544 proximate top 537 of second front surface 536.

Once coupled to base 520, cover may be removed by lifting straight up, causing tongue components 580, 582 to become unseated from within groove. Preferably, however, a user may engage cover, e.g., on outer side 570 proximate bottom 564. Cover 560 then may be lifted upwards while bottom 564 is pulled forwards, towards hook 522. During this process, angled face 585 of cover may slide along angled face 594 of base and/or front face of cover step 586 may translate against or relative to front face of base step 593. As radiused edge 587 clears top 537 of second front surface 536, cover 560 may be sufficiently loosened that it may be disengaged and separated easily from base 520.

When base 520 and cover 560 are coupled, detents 531, 581 are engaged with one another, as seen in FIG. 18. By pulling cover 560 forward instead of solely upward, detents may be separated by minimizing or eliminating the time when they are in an interference relationship with one another. Separation between detents 531, 581 may be assisted via taper 565 on cover 560. Taper 565 may cut the corner between back 568 and inner side 571 of cover. Taper may extend substantially along a length of detent 581 and may be thicker proximate the upper end of detent 581 than its lower end. Because detents 531, 581 may be responsible for a significant portion of engagement between base and cover, allowing detents 531, 581 to bypass one another more quickly may lead to faster, easier separation of base and cover.

Once tongue components 580, 582 are removed from within groove, ears 574 on cover 560 may remain at least partially engaged with notches 550 on base 520. Completing separation of cover 560 from base 520 then may include lifting cover 560 upwards until ears 574 clear notches 550.

Method of Use

Each of the holder systems 10, 110, 210, and 510 may be used by a method including the steps of selecting a location on a substrate 2, driving anchor 4 into substrate 2 and, if present, into support behind substrate 2, positioning the holder against the wall or ceiling at the selected position such that tang or tangs and barb 92 initially may indent surface of substrate 2 and such that opening 46 is substantially aligned with bore of anchor 4, aligning fastener 6 with opening 46, inserting fastener 6 through opening 46 and into bore, rotating fastener 6 in a clockwise direction so that fastener 6 engages anchor 4, pressing on the first portion 20 to cause the rearwardly projecting tang 56, if present, to puncture the surface of the substrate 2 and extend a short distance into the substrate 2 and so that first portion 20 may deform, causing one or more of the raised lobe 52 and stopper pad 59 to contact substrate 2, and continuing to rotate fastener 6 until fastener head engages recess 48 and first portion 20 is fastened securely and, preferably, rotationally fixedly, to substrate 2.

In addition, the method may include aligning cover 60 with first portion 20, sliding tapers 65 of cover 60 along substrate, and sliding cover 60 onto first portion to cover or disguise the appearance of fastener(s) 6, so that first and second tongue components 80, 82 operatively engage groove 44, ears 74 operatively engage notches 50, guides 78 operatively engage generally axial sides 35, and/or male detents 81, 83 operatively engage female detents 31, 33.

When the cover 60 is installed on first portion 20, cam member 84 on cover 60 may bear on top 26 of first portion 20. The tapers 65 proximate bottom 63 of rear edge 61 may bear on the face of the substrate 2. In between these bearing points, the male detents 81, 83 may engage the female detents 31, 33. The surfaces bearing against one another may create a snap fit or spring action between first portion 20 and cover 60 to create positive retention of cover 60.

While the foregoing written description of the invention enables one of ordinary skill to make and use what is considered presently to be the best mode thereof, those of ordinary skill will understand and appreciate the existence of variations, combinations, and equivalents of the specific exemplary embodiments and method herein. The invention should therefore not be limited by the above described embodiments and method, but by all embodiments and methods within the scope and spirit of the invention as claimed.

What is claimed is:

1. A substrate-mountable holder system, comprising:
   a first portion comprising a base having an opening for receiving a fastener to mount the base to a substrate, a hook, a first front surface and a second front surface with a groove therebetween, wherein the groove includes a rearward facing face having a step; and
   a second portion for operatively engaging the first portion, the second portion including a tongue component positionable within the groove, wherein the tongue component includes a forward facing face having a step;
   wherein the step on the second portion has a horizontal length greater than a horizontal length of the step on the first portion, and wherein horizontal lengths are measured in a direction perpendicular to a rear surface of the base.

2. A holder system according to claim 1, wherein the groove includes a ramp surface between the step on the first portion and a bottom of the groove.

3. A holder system according to claim 1, wherein the tongue component includes an angled face between the step on the second portion and a bottom of the tongue component.

4. A holder system according to claim 1, wherein the step on the second portion includes a radiused edge.

5. A holder system according to claim 1, wherein the step on the first portion has a height generally equal to a height of the step on the second portion.

6. A holder system according to claim 1, the second portion comprising an ear and the first portion comprising a notch configured to receive the ear.

7. A holder system according to claim 6, wherein the notch extends downward from a top of the first portion.

8. A holder system according to claim 6, wherein the notch has a height such that the ear remains disposed within the notch after the tongue component clears the rearward facing face of the groove.

9. A holder system according to claim 6, wherein the notch has a first notch surface at a first depth relative to a back of the base and a second notch surface at a second, deeper depth relative to the back.

10. A substrate mountable holder system, comprising:
    a base having a first front surface and a second front surface, a rear surface, a top and a bottom, an opening for receiving a fastener, a hook extending from proximate the bottom, and a channel between the first and second front surfaces;
    the base further including at least one notch extending inward from the rear surface, the notch having a first surface at a first depth relative to a rear surface of the base and a second surface at a second, deeper depth relative to the rear surface; and
    a cover having at least one ear for releasably engaging the at least one notch.

11. A holder system according to claim 10, further comprising a plurality of openings for receiving a plurality of fasteners.

12. A holder system according to claim 10, the cover further comprising a plurality of guides extending inward from a side of the cover.

13. A holder system according to claim 12, wherein one of the guides forms a lower portion of one of the at least one ears.

14. A holder system according to claim 12, wherein the base has a first width along the at least one notch and a second, wider width below the at least one notch; and further wherein at least one of the guides extends inward a smaller amount than another one of the guides to accommodate the second, wider width of the base.

15. A holder system according to claim 10, wherein when the cover is coupled to the base, at least a portion of the ear is disposed along the first surface of the notch.

16. A holder system according to claim 10, the cover comprising: a hook extending away from a front surface;
    wherein the at least one ear extends between about ⅓ and about ½ the height of the cover.

17. A holder system according to claim 10, the notch further comprising an inset portion proximate the top, the inset portion extending inwards from the second surface and having a depth substantially equal to the first surface.

18. A holder system according to claim 17, the at least one ear configured to be received in the notch at substantially all of the inset portion and a majority of the first surface.

19. A holder system according to claim 17, wherein at least one of the base and cover is substantially symmetrical.

* * * * *